(12) United States Patent
Richardson, Jr. et al.

(10) Patent No.: US 6,387,156 B1
(45) Date of Patent: May 14, 2002

(54) FILTRATION SYSTEM FOR COLLECTING AND FILTERING PARTICLES AND FUMES FROM ABLATIVE IMAGING PLATES

(75) Inventors: Donald B. Richardson, Jr., Atkinson, NH (US); Jeffery Knox, Lynnfield, MA (US); Pedro Beildeck, Chester, NH (US); Louis M. Schoenthal; Richard Davenport, both of Billerica, MA (US); John L. Kremer, Bozrah, CT (US)

(73) Assignee: Agfa Corporation, Wilmington, MA (US)

( * ) Notice: Subject to any disclaimer, the term of this patent is extended or adjusted under 35 U.S.C. 154(b) by 16 days.

(21) Appl. No.: 09/621,637

(22) Filed: Jul. 21, 2000

Related U.S. Application Data

(60) Provisional application No. 60/204,278, filed on May 15, 2000.

(51) Int. Cl.[7] .......................... B01D 53/04; B01D 35/14
(52) U.S. Cl. ................... 95/19; 95/90; 95/287; 96/113; 96/117; 96/138; 96/142; 96/418; 96/421; 96/423; 55/323; 55/328; 55/332; 55/356; 55/422; 55/471; 55/485
(58) Field of Search ............................... 95/19, 22, 90, 95/273, 287, 291; 96/113, 114, 117, 134–136, 138, 142, 418, 421, 423; 55/318, 323, 328, 332, 350.1, 356, 357, 422, 467, 471–473, 482, 485

(56) References Cited

U.S. PATENT DOCUMENTS

| | | | | |
|---|---|---|---|---|
| 2,853,153 A | * | 9/1958 | Sexton | 55/482 X |
| 3,354,616 A | * | 11/1967 | Lucas | 55/422 X |
| 4,002,443 A | * | 1/1977 | Lorenz | 55/422 X |
| 4,199,838 A | * | 4/1980 | Simonsson | 96/418 X |
| 4,290,792 A | * | 9/1981 | Eckstein et al. | 55/422 X |
| 4,435,194 A | * | 3/1984 | Picard et al. | 95/19 |
| 4,733,431 A | * | 3/1988 | Martin | 96/418 X |
| 4,751,501 A | * | 6/1988 | Gut | 96/421 X |
| 4,786,295 A | * | 11/1988 | Newman et al. | 96/421 X |
| 4,946,480 A | * | 8/1990 | Hauville | 55/482 X |
| 5,069,691 A | * | 12/1991 | Travis et al. | 55/467 X |
| 5,417,729 A | * | 5/1995 | Greenleaf, Sr. | 55/467 X |
| 5,447,544 A | * | 9/1995 | Birdwell | 96/423 |
| 5,574,493 A | * | 11/1996 | Sanger et al. | 347/262 |
| 5,593,470 A | * | 1/1997 | Shagott et al. | 55/274 |
| 5,611,922 A | * | 3/1997 | Stene | 55/422 X |
| 5,772,711 A | * | 6/1998 | Kieffer | 95/19 X |
| 5,780,806 A | * | 7/1998 | Ferguson et al. | 219/121.68 |
| 5,837,040 A | * | 11/1998 | Caughron et al. | 55/467 X |
| 5,853,441 A | * | 12/1998 | Groen et al. | 55/350.1 |
| 5,902,182 A | * | 5/1999 | Kramer | 55/467 X |
| 6,022,389 A | * | 2/2000 | Vross et al. | 55/467 X |
| 6,096,224 A | * | 8/2000 | Champie | 96/421 X |
| 6,097,417 A | * | 8/2000 | Richardson et al. | 347/225 |
| 6,267,793 B1 | * | 7/2001 | Gomez et al. | 55/422 X |

* cited by examiner

Primary Examiner—Robert H. Spitzer
(74) Attorney, Agent, or Firm—Alfred A. Stadnicki; Edward L. Kelley

(57) ABSTRACT

A filtration system, includes a filtration unit and processor. The filtration unit operates to filter ablative particles generated by thermal imaging of media and transmits a signal corresponding to a parameter, such as a pressure or pressure differential, representing a current state of the operation of the filtration unit, such as the state of the filters, during the filtering of the ablative particles. The processor receives the transmitted signals and generates, responsive to the receipt of the transmitted signal, a signal representing operator information associated with the current state operation, such as a warning or instructions for correcting a deficiency, and/or a signal to stop the imaging of the media.

34 Claims, 21 Drawing Sheets

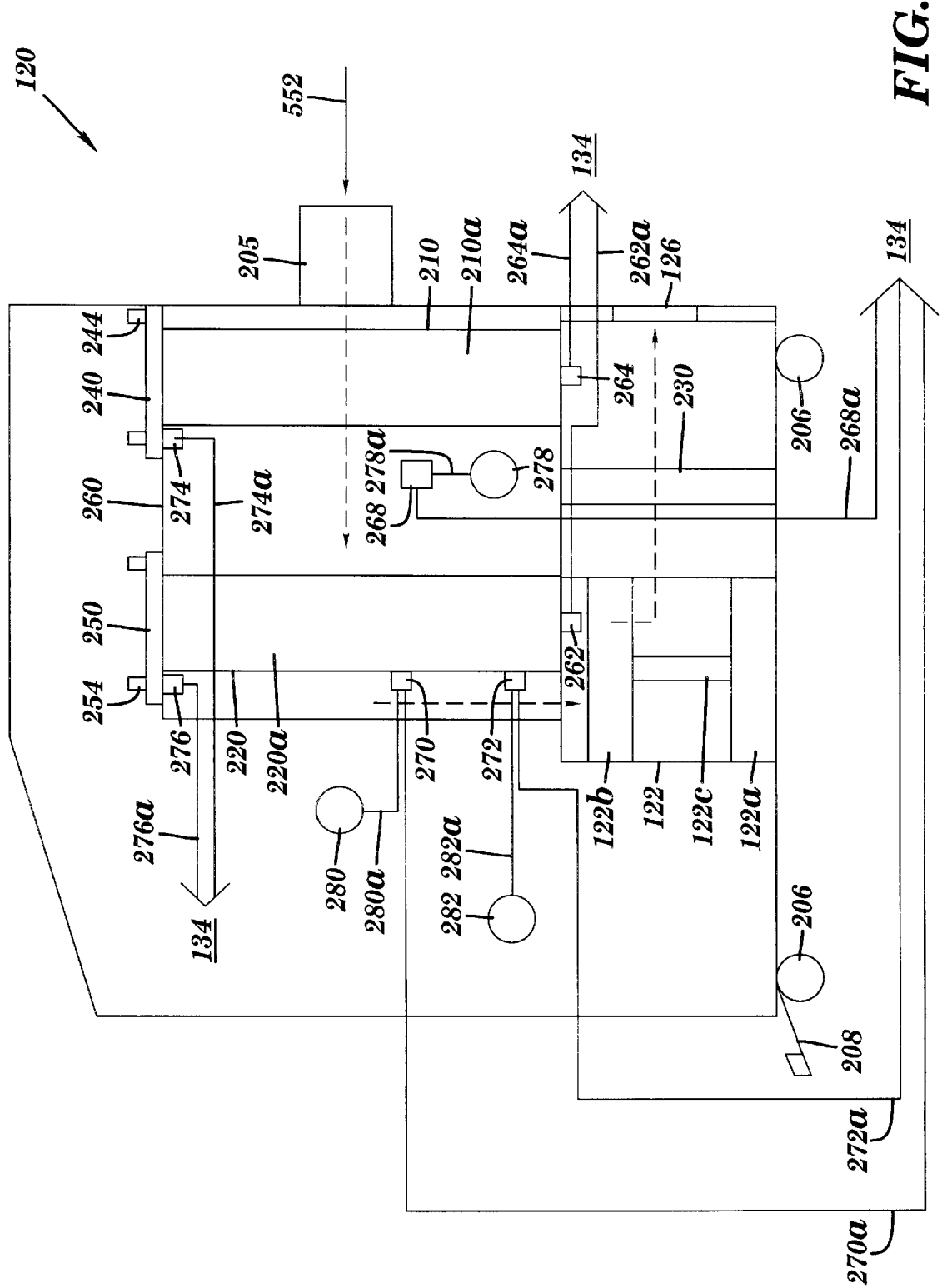

FILTRATION SYSTEM FOR COLLECTING AND FILTERING PARTICLES AND FUMES FROM ABLATIVE IMAGING PLATES

RELATED APPLICATIONS

The present application is related to pending U.S. patent application Ser. Nos. 09/157,849, 09/621,172, 09/621,638, and 09/621,640.

This appln claims claims benefit to No. 60/204,278 filed May 15,2000.

TECHNICAL FIELD

The present invention relates generally to collecting laser ablated particles, and more particularly to the filtering of the ablated particles resulting from imaging on a medium with a high energy laser.

BACKGROUND OF THE INVENTION

In the prepress printing industry, it is well known that a substrate such as a film or printing plate (hereinafter collectively referred to as a "medium") can have an image transferred thereto by selectively "burning" areas of a thermally-sensitive surface of the medium with a high energy laser. This method of imaging is generally referred to as thermal imaging. Typically, the power necessary for such image transfer is attained through the use of a laser light source for emitting the high energy laser beam. The specific chemical makeup of the medium will dictate the required characteristics of the light source which are necessary to adequately burn an image onto the medium. Alternatively, the medium can be manufactured so as to have the appropriate chemical makeup to allow imaging with a light source having predetermined characteristics.

In an internal drum imagesetter or platesetter (hereinafter collectively referred to as an "imager") a medium is typically positioned on the internal cylindrical surface of the drum prior to imaging. When a laser beam is emitted onto the thermally-sensitive surface of the medium positioned within the imager to form the desired image, laser ablation occurs. Laser ablation refers to the loss or removal of material such as melting or vaporization, due to the application of a high energy laser beam with sufficient energy to expose the medium. The material can effectively explode from the surface of the medium, resulting in ablated particles. Thermal imaging thus generates a gaseous, odorous plume of smoke and dust, which include particulate matter.

Existing filtration systems are designed to collect and filter the ablative particles generated during imaging. However, existing filtration systems have several problems. For example, the filtration system may operate improperly for various reasons, such as improper installation of a filtering element, saturation of a filtering element with ablative particles, or the non-operation of the air mover subsystem to specification. Typically the only way to determine when a conventional filtration system is operating improperly is either to periodically inspect the filtering elements and the air mover or to make such inspections when the quality of the imaged media degrades to an unacceptable level due to the accumulation of ablative particles in the imager. Additionally, in conventional filtration systems ablative particles are prone to enter the surrounding environment when a filter, saturated with ablative particles, is removed from the system for replacement. Such emissions can be undesirable whether or not the escaping particles exceed the permissible exposure levels (PEC) at which the particles can become hazardous to humans. Ablative particles may not be properly filtered by conventional filtration systems during operation of the imager if a filter access door or other opening in the filtration system housing is not properly closed or sealed prior to initiating imaging operations. Additionally, conventional ablative particle filtration systems tend to transmit excessive noise to the surrounding environment during operation.

Therefore a need exists for an improved filtration system for ablative particles.

OBJECTIVES

Accordingly, it is an object of the present invention to provide an improved ablative particle filtration technique.

Additional objects, advantages, and novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY OF INVENTION

In accordance with the invention, a filtration system includes a filtration unit operable to filter ablative particles generated by thermal imaging of media. The ablative particles may, for example, be generated by an imaging unit. The filtration unit, or in accordance with certain implementations the imaging unit, is configured to transmit a signal corresponding to a parameter representing a current state of the operation of the filtration unit. Advantageously, the filtration unit and/or imaging unit include one or more sensors for generating the transmitted signal.

The parameter could be any appropriate parameter indicative of the unit operation. For example, the parameter could be a pressure related parameter, which might be sensed by a pressure sensor, and is preferably a change in pressure exceeding a predetermined threshold value. The parameter could alternatively be a power parameter, such as voltage or current, such as that flowing through an electro-mechanical sensor, e.g. a switch, when it closes a circuit. A still further alternative could be a light parameter, such as that which might be sensed by an optical sensor. Of course, if desired, signals representing multiple different parameters could be transmitted.

The represented current state of operation preferably includes a current state of one or more filters. For example, the parameter could indicate that a filter is fully saturated, improperly installed and/or not installed. The represented current state of operation could additionally or alternatively be the current state of an air-mover, perhaps indicating that the air mover is improperly operating and not operating at all. Furthermore, the represented current state of operation could also or alternatively be the current state of a filter access door, and could for example be indicative of a filter access door not being properly closed, which may or may not be related to whether or not the door is properly latched. The represented current state of operation might also or alternatively be the current state of a filter clamp, and could for example be indicative of a filter clamp being properly positioned, which may or may not relate to whether or not the clamp is properly locked in position. The represented current state of operation could additionally or alternatively be a positioning of the filtration unit, by for example the operator, relative to the imaging unit.

A processor receives the transmitted signals and generates, responsive to the receipt of the transmitted signal, a signal representing operator information associated with the current state of operation. The represented operator information could, for example, be a warning and/or a process. The warning could simply be a statement such as "filtration unit not properly operating- do not attempt imaging", or "saturated filter", or "filter door open", or "filter not installed". The process could be instructions for correcting the deficiency in the current state of operation. For example, the signal might represent instructions for changing the appropriate filter, or checking the installation of the appropriate filter, or checking the appropriate filter access door, or checking if the unit is plugged into the power source.

In one embodiment of the invention, the filtration unit, may include a plurality of filters, disposed within a housing, for filtering ablative particles generated by thermal imaging of media. A plurality of sensors, each configured to detect the applicable parameter representing the current state of a respective one of the plurality of filters may also be disposed within the housing.

Advantageously, the embodiment includes a plurality of indicator lights, although this is not mandatory. Beneficially the lights are attached to an outer surface of the housing. If included, each of the lights is configured to illuminate if the parameter detected by a respective one of the plurality of sensors corresponds to a predefined threshold value. The illumination of each of the plurality of indicator lights could, for example, represent saturation of an associated filter.

An air-mover disposed within the housing for moving the ablative particles to each of the plurality of filters may also be included. In such a case, the parameter detected by one of the plurality of sensors could also represent a current state of the air-mover. optionally, an indicator light can be illuminated if the current state of the air-mover operation does not conform to a predetermined standard, e.g. does not create a pressure within a particular threshold.

Typically, although again this is not mandatory, one or more access doors, which are movable to provide access to one or more of the filters, will be included in the unit. In such case, the parameter detected by one or more of the sensors preferably represents a current state of the access door. These sensors may be of a different type from those used to detect the state of the filters and air mover. For example, simple electro-mechanical switches or optical sensors may be highly suitable for use in determining the state of an access door. Here again, if indicator lights are provided, one or more of the lights could, if desired, be configured to illuminate if the current state of an associated access door is not properly closed.

If clamps or other mechanisms are used in the installation of the filters, the parameter detected by one or more of the sensors may optionally represent a current state of the clamp, and thereby indicate whether or not the filter is properly installed. These sensors may also be of a different type from those used to detect the saturation state of the filters or the operational state of the air mover. Again, simple electro-mechanical switches or optical sensors may be highly suitable for use in determining the state of a clamping or other mechanism. Once again, if indicator lights are provided, one or more of the lights could, if desired, be configured to illuminate if a clamp or other mechanism is not properly positioned, e.g. locked in place.

In a particularly advantageous implementation, the filters include a coarse ablative particle filter, a fine ablative particle filter and an adsorbent cell disposed in series along the flow path of the ablative particles. The sensors include a first sensor disposed downstream of the coarse ablative particle filter, a second sensor disposed downstream of the fine ablative particle filter, and a third sensor disposed upstream of the air-mover and downstream of the fine ablative particle filter. Using this sensor configuration, the first sensor could be used to detect a saturated coarse ablative particle filter, the second sensor could be used to detect a saturated fine ablative particle filter, and the third sensor could be used to detect an improperly or non-operating air-mover.

BRIEF DESCRIPTION OF THE DRAWINGS

The aforementioned invention is described in detail below with reference to the accompanying drawings in which the same reference numerals are used throughout for denoting identical elements, and wherein:

FIG. 2A shows a more detailed side view of the filtration unit shown in FIG. 1.

DETAILED DESCRIPTION OF THE PREFERRED EMBODIMENTS

Figure 1:
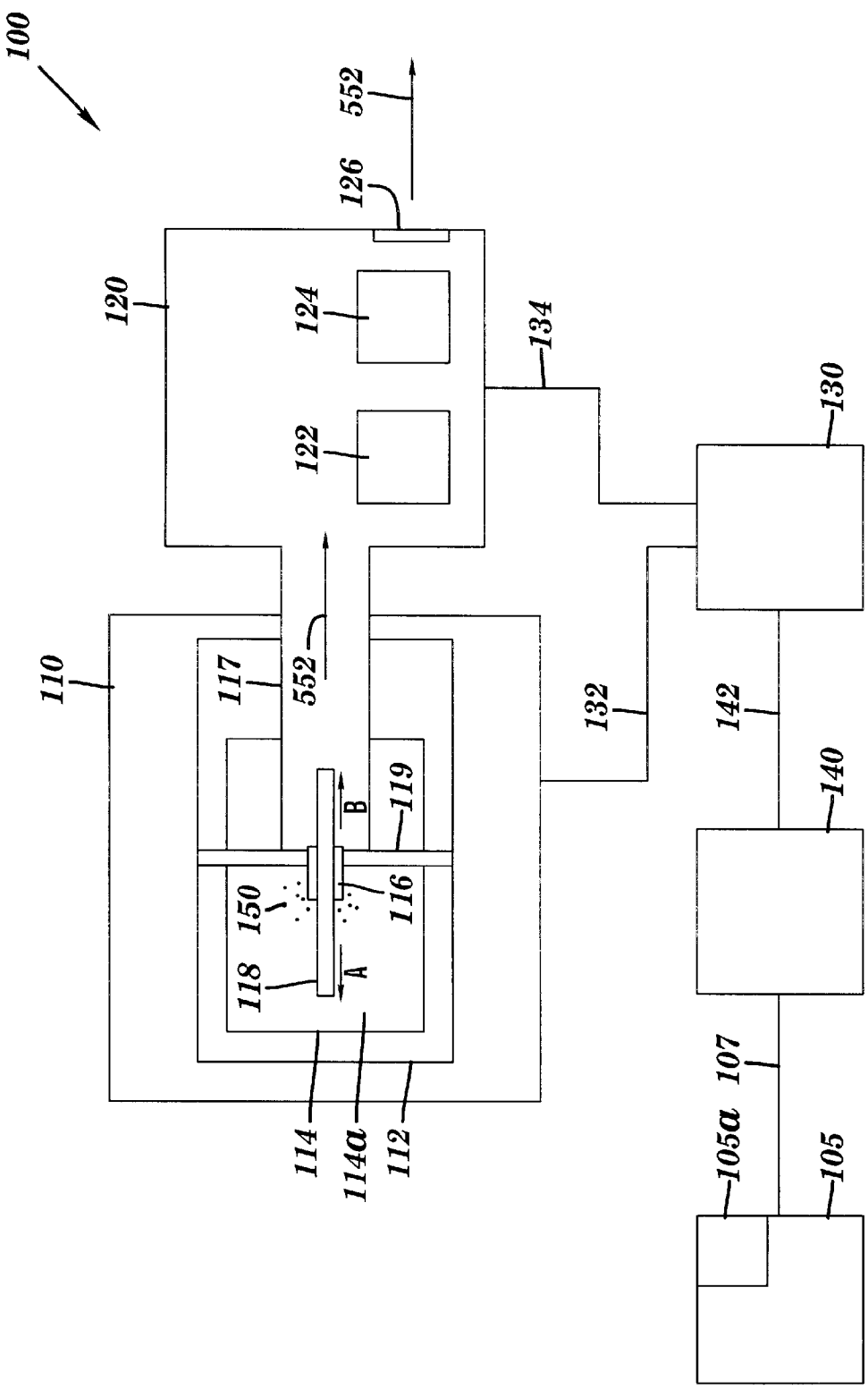
FIG. 1 is a simplified top view of an imaging system according to the present invention.

FIG. 1 is a top view of a thermal imaging system 100, including an imager 110, filtration unit 120, processor 130, raster image processor (RIP) 140 and front-end controller 105 according to the present invention. The processor 130 may be installed within the imager 110 or could be multiple processors installed within the imager 110 and filtration unit 120 which are interconnected by an interface (not shown) so as to be capable of intercommunicating with each other. Alternatively and as shown in FIG. 1, the processor 130 may be housed in a separate unit which interconnects to the imager 110 and filtration unit 120.

The front-end controller 105 typically serves as the primary operator interface to the thermal imaging system 100, and conventionally includes a display 105a to communicate system operational information to the system operator. As shown, the controller 105 interconnects to the other system components through the RIP 140 via communication interface 107. However, it will be understood by those skilled in the art that the controller 105 could alternatively include additional interfaces to other system components. For example, the controller 105 could have an interface directly to the processor 130 or to alternative processors (not shown) included in the imager 110 and filtration unit 120, if so desired. Additionally, it will be recognized that the front-end controller 105 may be located remote from the other system components. For example, the interface 107 could form part of a communications network which would allow the controller 105 to be located at virtually any physically remote location, and interconnected to the network to control the operation of the other components of the system 100.

As shown the imager 110 includes an internal cylindrical drum surface 112 upon which a film, printing plate or other medium 114, having a thermally-sensitive surface 114a facing away from the internal drum surface 112, is positioned for imaging. A laser scan assembly 116 is moveably mounted to a rail 118. A typical scan assembly for an internal drum imaging system will include, a laser light generator, a spin mirror and other optical devices to direct a laser beam onto the thermally-sensitive surface 114a, as is well understood by those skilled in the art.

To image the medium 114, the laser scan assembly 116 transmits a beam so as to impinge on the thermally-sensitive surface 114a of the medium 114 and thereby burn an image onto the surface 114a in accordance with instructions received from processor 130 via communications interface 132. Processor 130 in turn receives its instructions from raster image processor 140 via communications interface 142. The image is burned onto the surface 114a while the laser scan assembly 116 moves in a direction A along the rail 118.

After the media 114 is imaged, the power or the laser beam emitted by the laser scan assembly 116 is reduced to a non-imaging level, and the assembly 116 is moved along the rail 118 in the direction B back to its start position. The imaged medium 114 is removed from the imager 110, and another medium 114, typically of the same type, although this is not mandatory, is positioned on the drum 112. The power of the laser beam emitted from the scan assembly 116 is increased to an imaging level, and imaging of the newly positioned medium 114 begins.

During imaging of the medium 114, laser ablation of the medium 114 will cause ablated particles 150 to be removed from the medium surface 114a. Thermal imaging thus commonly generates smoke and dust including particulate matter. The dust can collect on components of the laser scan assembly 116, such as lenses, the spin deflector and other optical components. Dust may additionally collect on written or unwritten portions of the thermally-sensitive surface 114, on the internal drum surface 112, and on other components located within, or contacting, the air space within the imager 110. Particles can also collect on to medium transfer mechanisms, e.g. transport rollers and suction cups, compromising operations of these components.

The build-up of the ablated particles 150 can negatively impact on the imaging quality and hence accuracy of the image transferred to the medium 114. For example, the deposit of ablated particles on either the written or unwritten portions of the medium 114 will affect the texture of the surface 114a. The deposit of such particles will also affect the thickness and material composition of the medium. This in turn may cause degradation of any image burned thereon. Additionally, smoke, which is a combination of air and suspended ablative particles, generated by the ablation process can interfere with the laser beam directed by the laser scan assembly 116 on to the medium 114. More particularly, the generated smoke may change the intensity, power and/or energy of the beam at the medium surface 114a.

To remove the ablative particle dust and smoke, a flexible, expandable duct or hose 117 is secured at one end to a vacuum head 119. The expandable duct 117 can also be secured at its other end so that a stream or flow of air shown as arrow 552, and ablative particles 150 vacuumed from the imager 110, can be transported from the imager 110. Components for removing ablative particles from the imager are described in greater detail in co-pending U.S. application Ser. No. 09/157,849 which is assigned to the assignee of the present application.

The stream of air and ablative particles are vacuumed from the imager 110 using negative pressure generated by the air-mover 122 within the filtration unit 120. The expandable duct 117 transports the stream of air and ablative particles from the imager 110 to the filtration unit 120, where the ablation particles 150 are collected from the stream by filters 124, as will be discussed further below. After filtering, the filtration unit 120 exhausts a substantially clean airflow from vent 126. As shown, the filtration unit operates in accordance with instructions received from processor 130 via communications interface 134.

FIG. 2A further details the filtration unit 120 of FIG. 1. The expandable duct 117 transports the stream of air and ablative particles from the imager 110 to the transport tube 205 which may be part of the filtration unit 120, a filter cassette, as will be described further below, or the imager 110. As shown, the filtration unit 120 is supported by multiple wheels 206, two of which are depicted in FIG. 2A. The wheels allow the unit 120 to be moved into an appropriate operating location, e.g. close enough to the imager 110, to properly position the transport tube 205 with respect to either the expandable duct 117, if tube 205 forms part of the filtration unit 120, or a filter cassette if the tube 205 forms part of the imager 110. At least one of the wheels 206 has an associated brake and position locking mechanism 208 which can be used to stop the movement of the filtration unit 120 and, if desired, lock the filtration unit 120 at a desired position.

The stream of air and ablative particles entering transport tube 205 is directed to a coarse filter cassette 210 often referred to as a pre-filter, which includes a coarse filter element 210a and is housed within filtration unit 120. Coarse filter element 210a preferably filters 99% of the ablative particles 150 which are, for example, 10 microns and larger in size from the stream of air and ablative particles transported from the imager 110 to the filter unit 120 by the duct 117. By filtering and thus collecting all or virtually all of the ablative particles 150 which are 10 microns and larger in size with coarse filter element 210a, the stream of air and ablative particles transported from the coarse filter cassette 210 will primarily, if not exclusively, include particles which are less than 10 microns in size. Because the remaining filters in the filtration unit 120, which will tend to be the more expensive filtration filters, are not required to collect a significant quantity of large ablative particles, the life of the more expensive downstream filters will necessarily be extended.

As further shown, filtration unit 120 also houses fine filter cassette 220, which includes a fine filter element 220a. Fine filter element 220a preferably filters 99.97% of the ablative particles which are, for example, 0.12 microns and larger in size from the stream of air and ablative particles leaving the coarse filter cassette 210. Accordingly, the fine filter element 220a will collect any particles of 10 microns or larger which have somehow passed through the coarse filter element 210a, which in any event will be very few in number. By filtering and thus collecting all or virtually all of the ablative particles 150 transported from the coarse filter cassette 210 which are, for example, 0.12 microns and larger in size with fine filter element 220a, the stream of air and ablative particles transported from the fine filter cassette 220 will primarily, if not exclusively, include particles which are, for example, less than 0.12 microns in size.

The stream of air and ablative particles is next transported from the fine filter cassette 220 to an adsorbent cell/muffler 230. If an adsorbent cell is utilized, adsorbent cell 230 removes organic gases and vapors from the received stream of air and ablative particles. It is perhaps worthwhile to note that unlike an absorbent cell, which removes material by absorbing it, an adsorbent cell attracts and/or retains particles by molecular attraction or electrostatic forces present between the particles and a filter medium. The chief adsorptive media used for filters are activated charcoal and similar forms of carbon, e.g. bone black, and Fuller's earth on active clays. These are all in granular form. A more rigid form of adsorbent filter can be produced by chemical treatment of papers with an adsorbent medium. One of the latest materials available here is charcoal cloth.

Adsorbent media are widely used for the removal of odors, smoke, fumes, etc. in a wide range of applications from domestic, e.g. kitchen cooker-hood filters, through to air-conditioning plants and to industrial fume removal. Activated charcoal is also the filter medium normally used for water purifying/clarifying on small-scale applications, e.g. drinking water supplied in caravans or boats. Industrially adsorbent filters are used for the removal of odors from oils, odors and tastes from foodstuffs, etc. The adsorbent property of the media means that they remove dissolved as well as un-dissolved contaminants, the medium being chosen accordingly.

In some cases an adsorbent cell is not required to remove organic gases and vapors. In these cases a muffler is utilized in lieu of an adsorbent cell. Leaving the adsorbent cell/muffler 230 is a stream of substantially clean air. This clean non-hazardous air stream is then exhausted through vent 126 into the surrounding environment or to a hose for directing the clean air stream to an external environment. In FIG. 2A, the vent 126 is depicted as a perforated plate. The use of a perforated plate vent is particularly suitable if the substantially clean air stream leaving the filtration unit 120 is to be exhausted to the surrounding environment.

As previously described, ablative particles 150 are vacuumed from the imager 110 and transported from the imager 110 to the filtration unit 120 due to a negative pressure generated by air-mover 122. As shown in FIG. 2A the air mover 122 includes a fan motor 122a and fan impeller 122b connected by a shaft 122c. Because the air-mover 122 is located downstream of the coarse and fine filter cassettes 210 and 220, negative pressure created by the air-mover 122 also transports the stream of air and ablative particles through the filter elements 210a and 220a. Since the air-mover 122 is disposed up stream of the adsorbent cell/muffler 230, a positive pressure created by the air-mover 122 additionally transports the stream of air and ablative particles, leaving the fine filter cassette 220, through the adsorbent cell/muffler 230.

As shown, the air and ablative particle stream enters a flow passage 260 from the transport tube 205, and is directed by passage 260 through filters 210 and 220, air mover 120, and absorbent cell/muffler 230. A substantially clean air stream is directed by the flow passage 260 from the cell/muffler 230 to the vent 126. In the FIG. 2A embodiment, access doors 240 and 250 are provided for installing and removing filter cassettes 210 and 220, respectively, in and from the flow passage 260. Door 240, in the closed position, is latched against the outer surface of flow passage 260 by locking mechanisms 244 to tightly seal the flow passage 260 with the coarse filter cassette 210 installed. Door 250, in the closed position, is latched against the outer surface of flow passage 260 by locking mechanism 254 to tightly seal the flow passage 260 with the fine filter cassette 220 installed. It will be recognized that, although not shown, a door would also typically be provided to install and remove the cell/muffler 230. As will be understood by those skilled in the art, other types of doors could be utilized if so desired. For example, sliding doors could be easily adapted to seal the access openings and hence be substituted for the depicted door arrangement, if so desired.

Although the doors 240 and 250 are latched to seal the openings in the passage 260 to the coarse and fine filter cassettes 210 and 220, because of the location of the doors 240 and 250 upstream of the air mover 120, the openings sealed by the doors 240 and 250 are subjected to a suction during operation of the filtration system. Hence the doors 240 and 250 are also pulled secure by the negative pressure in the flow passage 260 against the outer surface of the flow passage. However, latching further seals the doors 240 and 250 against the outer surface of the flow passage 260. This prevents the seepage of outside air into the flow passage which would reduce the negative pressure at the respective filter cassette. If the negative pressure at the output opening of the filter cassette 210 or 220 is reduced, this is likely to result in a corresponding reduction in ablative particle filtering by the applicable filter and hence could materially affect the quality of the imaging.

In order to monitor the proper operation of the filtration unit 120, multiple pressure sensors 268, 270, and 272 are provided as shown. Each of the pressure sensors is positioned to monitor the operation of the filtration unit 120 at a particular location associated with the operation of one of the components of the filtration unit 120. Each of the sensors includes a communications interface, such as a port, respectively identified with reference numerals 268A, 270a and 272a, for connecting to the communication interface 134 of the processor 130. Again, it should be understood that additional sensors and interfaces could be provided to monitor the filtration unit operation at other locations. For example, if desired, a sensor could be located upstream or downstream of the absorbent cell/muffler 230.

In order to determine whether the unit is properly operating, sensors 268–272 preferably detect a change of pressure over a threshold amount, at their respective locations within the flow passage 260. It should however be recognized that if desired the actual pressure could be detected and the processor 130 could determine if a change in the pressure exceeds a threshold change value.

In any event, with the preferred sensing, when coarse filter element 210a becomes fully saturated with ablative particles, sensor 268, which is disposed downstream of filter cassette 210, will detect a pressure differential w.v.t. inlet & outlet of the coarse filter 210 exceeding a threshold amount and generate a signal which is transmitted via communications interface 268a and the processor interface 134 to the processor 130.

Responsive to the received signal, the processor 130 can generate a display signal to provide a warning of coarse filter saturation and/or instructions to the operator for resolving the problem. For example, the instructions may advise the operator on a sequence of instructions for replacing a coarse filter cassette 210 which is saturated with ablative particles. Alternatively or additionally, the processor 130 can, if desired, automatically generate and transmit instructions to the imager 110 via communications interface 132 to prevent initiation of imaging, to discontinue imaging, to allow continued imaging, or to allow imaging to begin.

When fine filter element 220a becomes fully saturated with ablative particles sensor 270, which is disposed downstream of filter cassette 220 will detect a pressure differential w.v.t. inlet & outlet of the fine filter 220 exceeding a threshold amount and generate a signal which is transmitted, via communications interface 270a, and the processor interface 134, to the processor 130.

Responsive to the received signal, the processor 130 can generate a display signal to provide a warning and/or instructions to the operator for resolving the problem. For example, the instructions may advise the operator on a sequence of a fine filter cassette 220 which is saturated with ablative particles. Alternatively, or additionally the processor 130 can, if desired, automatically generate and transmit instructions to the imager 110 via communications interface 132 to prevent initiation of imaging, discontinue imaging, warn the operator while allowing continued imaging or the start of imaging.

Preferably, if adsorption cell 230 is not installed, a sensor, similar to those discussed below, will detect the absence of the cell 230. However, if desired, pressure sensing could be used to detect a clogged cell or muffler 230 in a manner similar to that described above.

If air-mover 122 is not operating or is not properly operating, sensor 272 immediately detects a pressure differential exceeding a threshold amount. In this case, sensor 272 generates and transmits signals to processor 130 via the communications interfaces 272a and 134.

Responsive to the received signal, the processor 130 can automatically generate and transmit instructions to the imager 110 via communications interface 132 to prevent initiation of image or discontinue imaging. If desired, the processor 130 can alternatively, or additionally, generate a display signal to provide a warning and/or instructions to the operator for resolving the problem. For example, the warning may advise the operator that the air-mover 122 is not operating or is not operating properly. Instructions may be provided for performing a sequence of checks to determine why the air-mover 122 is not operating or not operating properly to specification.

Optionally, the filtration unit 120 further incorporates status indicator lights 278, 280, and 282, which are respectively interconnected to sensors 268, 270, and 272 by interfaces 278a, 280a, and 282a. Responsive to a signal from sensor 268 representing a pressure change exceeding the threshold, the light 280 is illuminated to indicate to the system operator that a coarse filter cassette 210 is saturated and that the operator should change the coarse filter cassette.

Responsive to a signal from sensor 270 representing a pressure change exceeding the threshold, the light 280 is illuminated to indicate to the system operator that the fine filter cassette 220 is saturated and that the operator should replace the fine filter cassette.

Responsive to signals from sensor 272 representing a pressure change exceeding the threshold, the light 282 is illuminated to indicate to the system operator that a problem exists in the area of the air-mover 122 and that the operator should check air-mover to determine why it is not operating properly.

It should be noted that if filtration unit 120 is disconnected electrically during imaging or if the transport tube 205 or vent 126 were to be blocked during imaging, all or some of sensors 268–272 will detect a change in pressure exceeding the threshold amount and generate a signal which is transmitted via the applicable communications interfaces 268a–272a and the processor interface 134 to the processor 130. Because of the substantially simultaneous receipt of a given combination of sensor signals, if desired the processor 130 can be adapted to easily identify whether the problem is disconnection or blockage of the filtration unit 120.

Responsive to these received signals, the processor 130 can, if desired, automatically generate and transmit instructions to the imager 110 via communications interface 132 to prevent initiation of image or discontinue imaging. Alternatively or additionally, the processor 130 could be made to generate a display signal to provide a warning and/or instructions to the operator for resolving the problem. For example, instructions may advise the operator to reconnect or unblock the transport tube 205 or to unblock the vent 126, or provide a sequence of checks to identify and correct the problem.

Other sensors are provided to detect whether or not the filters 210 and 220 and the doors 240 and 250 are installed. More particularly, electro-mechanical switch 262 detects if the fine filter cassette 220 is installed in the flow passage 260. Sensor 264 detects if the coarse filter cassette 210 is installed in the flow passage 260. Sensor 274 detects if the coarse filter cassette door 240 is installed on the outer surface of the flow passage 260. Finally, sensor 276 detects if the fine filter cassette door 250 is installed on the outer surface on the flow passage 260. When the fine filter is installed, the sensor switch 262 transmits a signal via the sensor interface 262a to the processor 130 via the interface 134. When the coarse filter cassette 210 is installed, the sensor 264 transmits a signal over interface 264a to the processor 130 via interface 134. Similarly, when the door 240 is installed, the sensor 274 transmits a signal over interface 274a to the processor 130, via processor interface 134. With the door 250 installed the sensor 276 transmits a signal over the sensor interface 276a to the processor 130, via processor interface 134. It should be noted that the electro-mechanical sensors, 262, 264, 274 and 276 could easily be replaced by optical or other types of sensors if so desired.

It should also be noted that although the sensors 262, 264, 274 and 276 preferably are used only to detect whether or not the applicable filter or door is installed, if desired, more sophisticated sensing could be performed to ensure that the applicable filter or door is properly installed. In any event, the processor 130 processes the received sensor signals to continually monitor whether or not the filters and doors are installed. If the processor fails to receive a signal from any of the sensors, representing non-installation of the associated filter or door, the processor 130 generates and transmits a signal to the imager 110 via interface 132 to prevent the initiation or continuation of imaging by the imager 110. If desired, the processor 130 could also or alternatively generate a display signal to provide a warning and/or instructions to the operator for resolving the problem. For example, the instructions could advise the operator on a sequence of steps to be taken to install the applicable filter or close the applicable door.

Figure 2B:
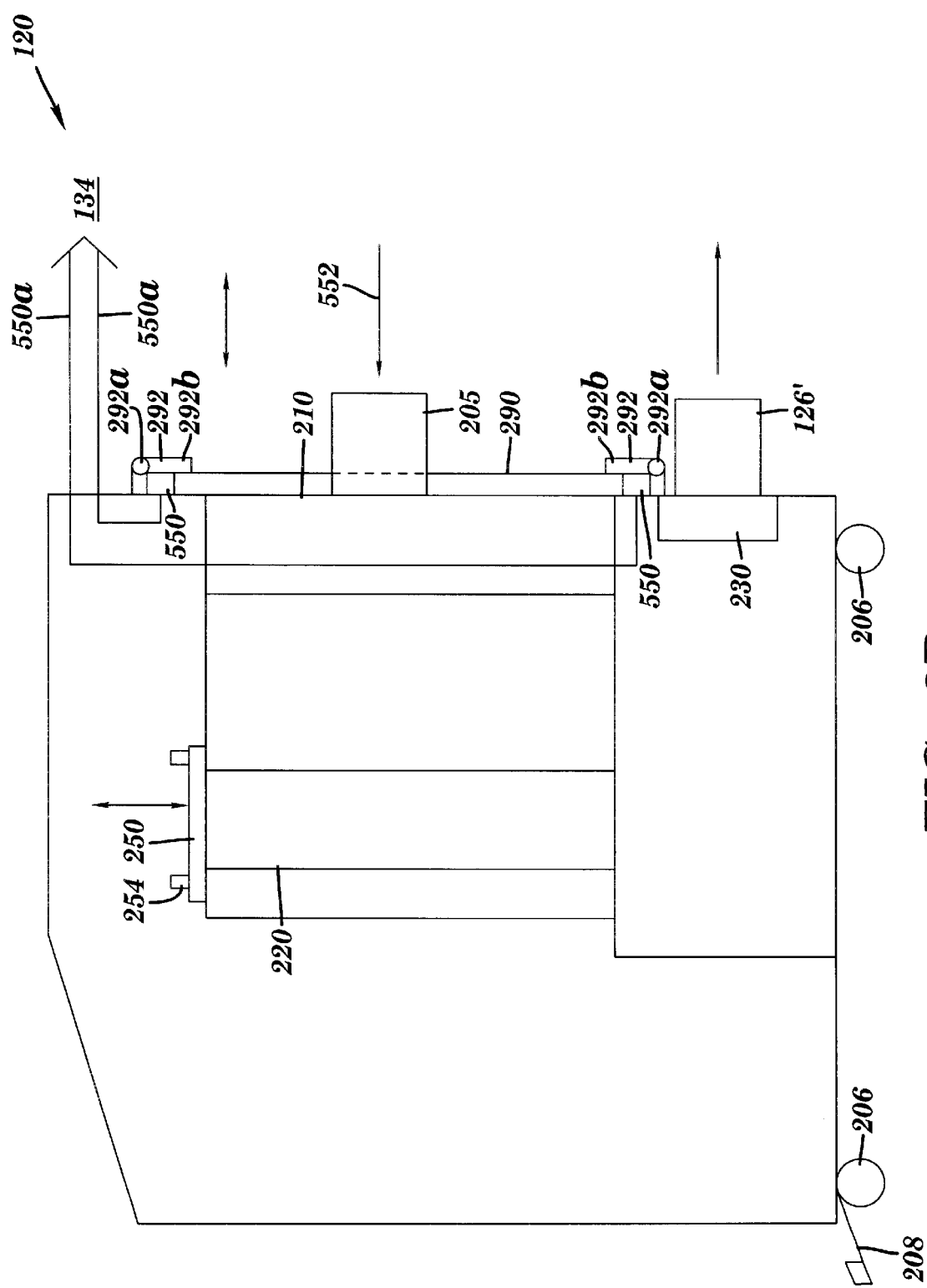
FIG. 2B shows an alternative configuration of the filtration units shown in FIG. 1, having modified filter cassette access openings.

FIG. 2B depicts an alternative configuration of the filtration unit 120 having modified filter cassette access openings. Except as described below, all other components of the filtration unit 120 of FIG. 2B, whether or no depicted in FIG. 2B, are identical to those shown and described above with reference to FIG. 2A.

As shown, the expandable duct 117 transports the stream of air and ablative particles from the imager 110 to the transport tube 205 which may be part of the filtration unit 120 or the imager 110, as described above, or may also be part of the coarse filter cassette 210. As previously discussed, the wheels 206 allow the unit 120 to be moved into an appropriate operating location, e.g. close enough to the imager 110 to properly position the transport tube 205 with respect to either (i) the expandable duct 117 if tube 205 forms part of the filtration unit 120 or the coarse filter cassette 210 or (ii) the coarse filter cassette 210 if the tube 205 forms part of the imager 110. A brake and position locking mechanism 208 can be used to stop the movement of the filtration unit 120 and, if desired, lock the filtration unit 120 at a desired position. In the FIG. 2B embodiment, access doors 290 and 250 are provided for installing and removing filter cassettes 210 and 220, respectively, in and from the flow passage 260. Door 290 is latched to a supporting structure by locking mechanisms 292 to tightly seal the flow passage 260 with the coarse filter cassette 210 installed. Locking mechanisms 292 as shown include a hinge 292a about which a portion of the mechanism rotates to facilitate removal of the door 290. A pin 292b is mounted to the rotating portion of the locking mechanism 292 to lock the rotating portion in place after installation of the door 290. It will be well understood that the locking mechanism 292 is exemplary only as such mechanisms can take on various configurations as is well known in the art. Associated with each of the locking mechanism 292 is a sensor 550. An electro-mechanical switch is depicted, however other types of sensors could be utilized if so desired, as has been previously discussed above. Each of the sensors 550 is interconnected via sensor interface 550a and processor interface 134 to the processor 130. The sensors operate in a manner similar to the operation of sensor 274 of FIG. 2A. It should be noted that the locking mechanism 292 and sensor 550 arrangement shown in FIG. 2B could be easily adapted to latch the fine filter cassette access door 250 or the coarse filter cassette access door 260 if so desired. The processor 130 responds to the signals received from the sensors 550 in the same manner as has been previously described with respect to the signals received from sensor 274, which accordingly will not be further described in order to avoid unnecessary duplication.

It should also be noted that in the filtration unit 120 of FIG. 2B, the perforated plate vent 126 of FIG. 2A has been replaced by vent tube 126' which is connected to adsorbent cell/muffler 230. By replacing the perforated plate vent 126 with the vent tube 126', the attachment of a flexible hose to direct the outlet flow to an external environment is facilitated.

Figure 2C:
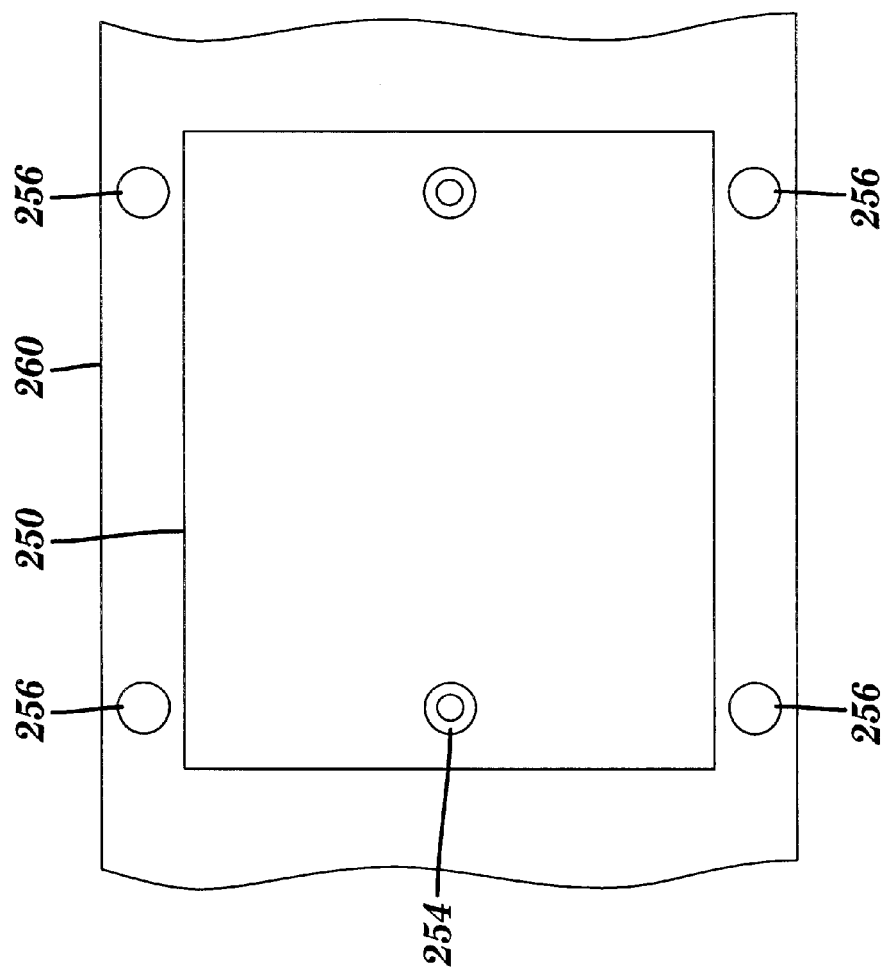
FIG. 2C shows a top view of the flow passage of the filtration unit shown in FIGS. 2A or 2B, with filter removal bag restraining pins.

FIG. 2C is a top view of the portion of the top of the flow passageway 260 through which fine filter cassette 220 can be installed and removed. As shown, four pins 256 are optionally attached to the outer surface of the top of the flow passageway 260 to support a filter discard bag (not shown), which is preferably formed of plastic material. More particularly, the pins 256 are positioned to form a perimeter around the access opening sealed by the access door 250. After the access door 250 is unlatched using latch 254 and removed, the discard bag (not shown) can be stretched over at pins 256 so as to cover fine filter cassette 220 and the flow passage in the area of the fine filter. The fine filter cassette covered by the discard bag can then be lifted out of the flow passageway by pulling handles attached to the fine filter cassette as will be described in detail below.

Figure 2D:
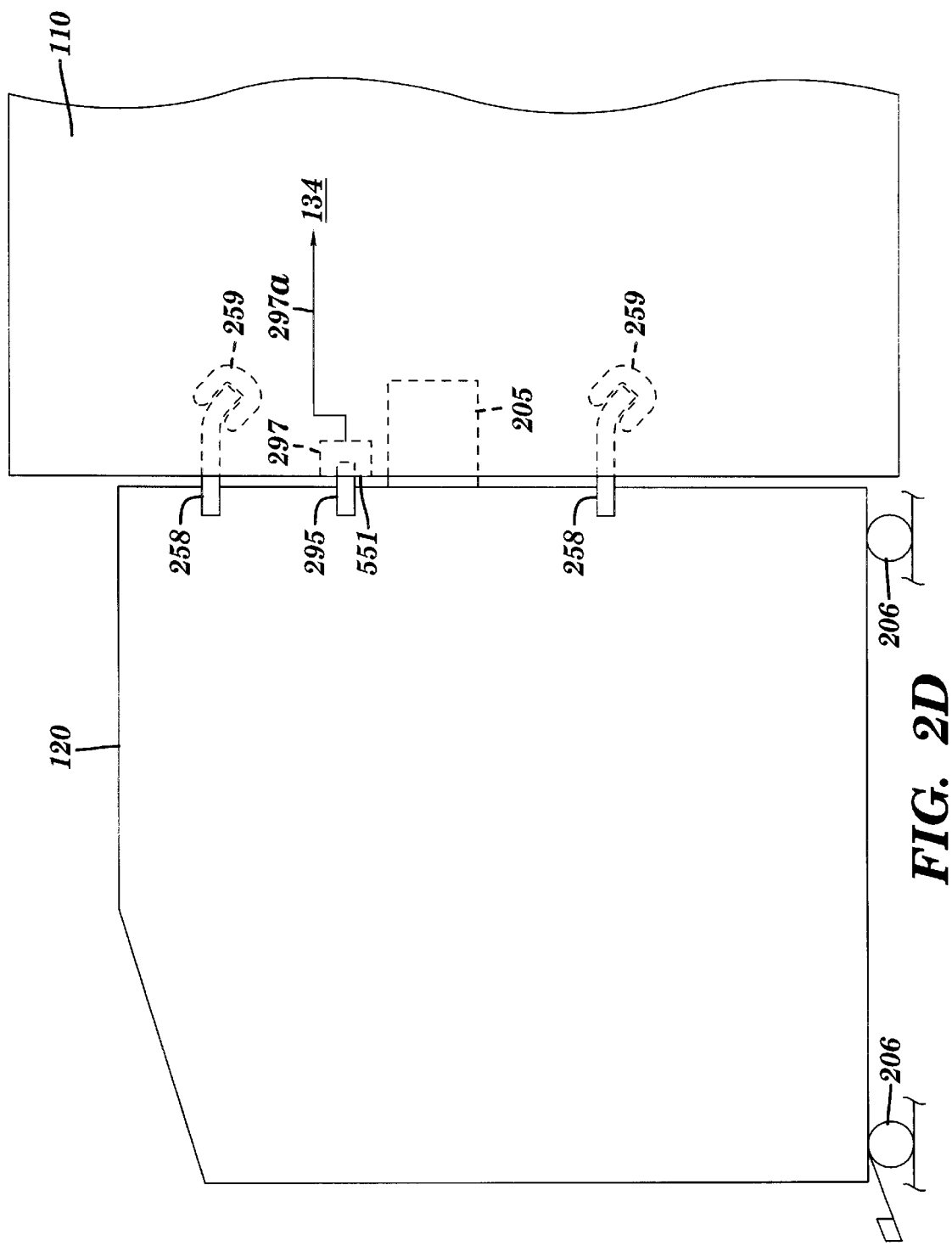
FIG. 2D shows a side view of the filtration unit connected to the imager in accordance with the present invention.

FIG. 2D depicts latching mechanisms 258 which are attached to a support member and extend from the filtration unit 120. The latching mechanisms 258 insert into hold mechanisms 259 of the imaging unit 110 to latch the filtration unit 120 to the imager 110. As shown, as the filtration unit is rolled on wheels 206 towards the imager 110 by an operator, latching mechanisms 258 are inserted into holder mechanisms 259. With the latching mechanism 258 fully inserted into the holder mechanism 259, the holder mechanisms 259 grip the latching mechanisms 258 with sufficient force to hold the filtration unit in the desired position adjacent to the imaging unit during operation of the two units, but with insufficient force to prevent an operator from pulling the filtration unit away from the imaging unit when desired.

As also shown in FIG. 2D probe mechanism 295 is also attached to a support member and extends from the filtration unit 120. The probe mechanism 295 inserts into an aperture 551 in the housing of the imager 110. The insertion of the probe 295 through the aperture 551 in the imager housing is detected by a sensor 297 when the latching mechanisms 258 are properly inserted into the hold mechanisms 295, to thereby ensure that the filtration unit 120 is properly positioned adjacent to the imaging unit 110 during imaging. The sensor 297 is depicted as an electro-mechanical switch but could be easily replaced by an optical or other type of sensor if so desired, as will be well understood by those skilled in the art.

As depicted, when the latching mechanisms 258 are properly installed within the hold mechanisms 259, the probe 295 activates the sensor 297, resulting in a signal being transmitted from the sensor 297 to the processor 130 via the sensor interface 297a and controller interface 134. The processor 130 processes the received sensor signal and continually monitors whether or not the filtration unit 120 is properly positioned with respect to the imaging unit 110 during imaging. If the processor 130 fails to receive a signal from the sensor 297, representing improper positioning of the filtration unit 120, the processor 130 generates and transmits a signal to the imager 110 via interface 132 to prevent the initiation or continuation of imaging by the imager 110. If desired, the processor 130 could also or alternatively generate, and transmit to controller 105, a further signal to provide a warning and/or instructions to the operator for resolving the problem. For example, such instructions could be displayed on controller display 105a to advise the operator on a sequence of steps to be taken to reposition the filtration unit 120 with respect to the imaging unit 110.

Figure 3A:
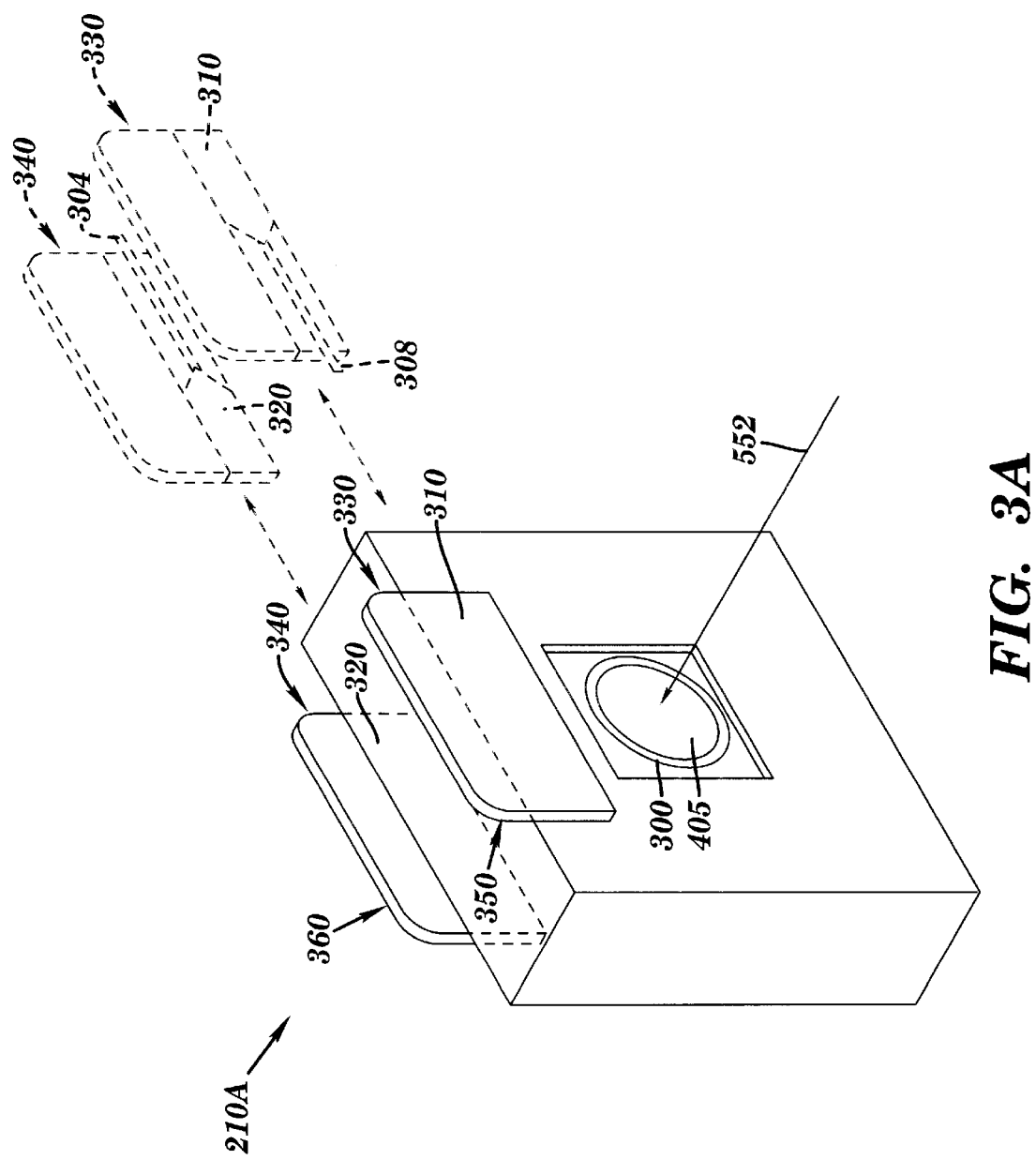
FIG. 3A shows an isometric view of a first embodiment of the coarse filter cassette in accordance with the present invention.
Figure 3B:
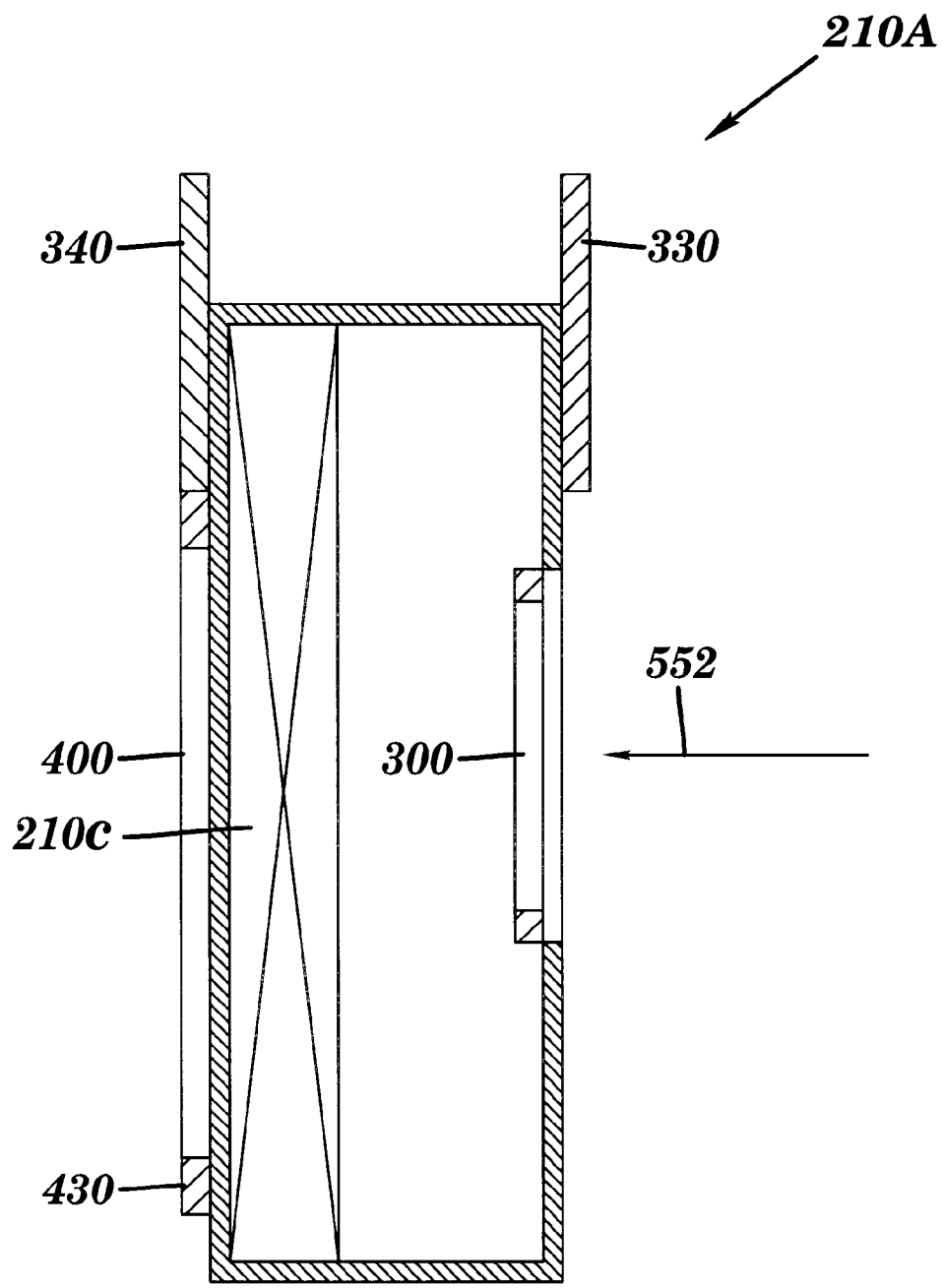
FIG. 3B shows a side view of the first embodiment of the coarse filter cassette in accordance with the present invention.

FIGS. 3A and 3B depict a first embodiment of the coarse filter cassette 210. As shown, the coarse filter cassette 210A includes a foam or preferably rubber seal 300, used for sealing the cassette to the transport tube 205, inserted in inlet opening 405, which receives the stream of air 552 and ablative particles 150 from the imager 110 and transports the received air stream to the coarse filter cassette 210A. The coarse filter cassette 210A includes coarse filter element 210a as has been previously described.

To install and remove the cassette 210A through the access area in the flow passage 260 created by removing the door 240, tack plates 330 and 340, having adhesive surfaces 310 and 320, are first adhered to the cassette 210A. With the tack plates attached to the surface of the coarse filter cassette 210A, handles 350 and 360 are used to move the cassette 210A to or from its proper installation position in the flow passage 260.

The adhesive surfaces 310 and 320 are protected by protective strips 304 and 308 when the tack plates 330 and 340 are not being used to install or remove the cassette from the flow passage 260. During installation or removal of the cassette, the adhesive surfaces 310 and 320 are revealed by removing protective strips 304 and 308 and adhered to the surface of the coarse filter cassette 210A as shown in FIGS. 3A and 3B.

Alternatively, rather than protect the adhesive surfaces 310 and 320 by applying protective strips 304 and 308, when the tack plates 330 and 340 are not being used to remove the cassette from the flow passage 260, the adhesive surfaces 310 and 320 can, if desired, be adhered to the top surface of the coarse filter cassette 210A, thereby protecting adhesive surfaces 310 and 320 from contamination and facilitating convenient storage for the tack plates 330 and 340.

As shown in FIG. 3B, a rubber or preferably foam insulating seal 430, surrounding the outlet opening 400, is attached, preferably by a permanent adhesive, to the downstream side of the coarse filter cassette 210A. The seal 430 helps to seal the cassette 210A within the flow passage 260.

Figure 4A:
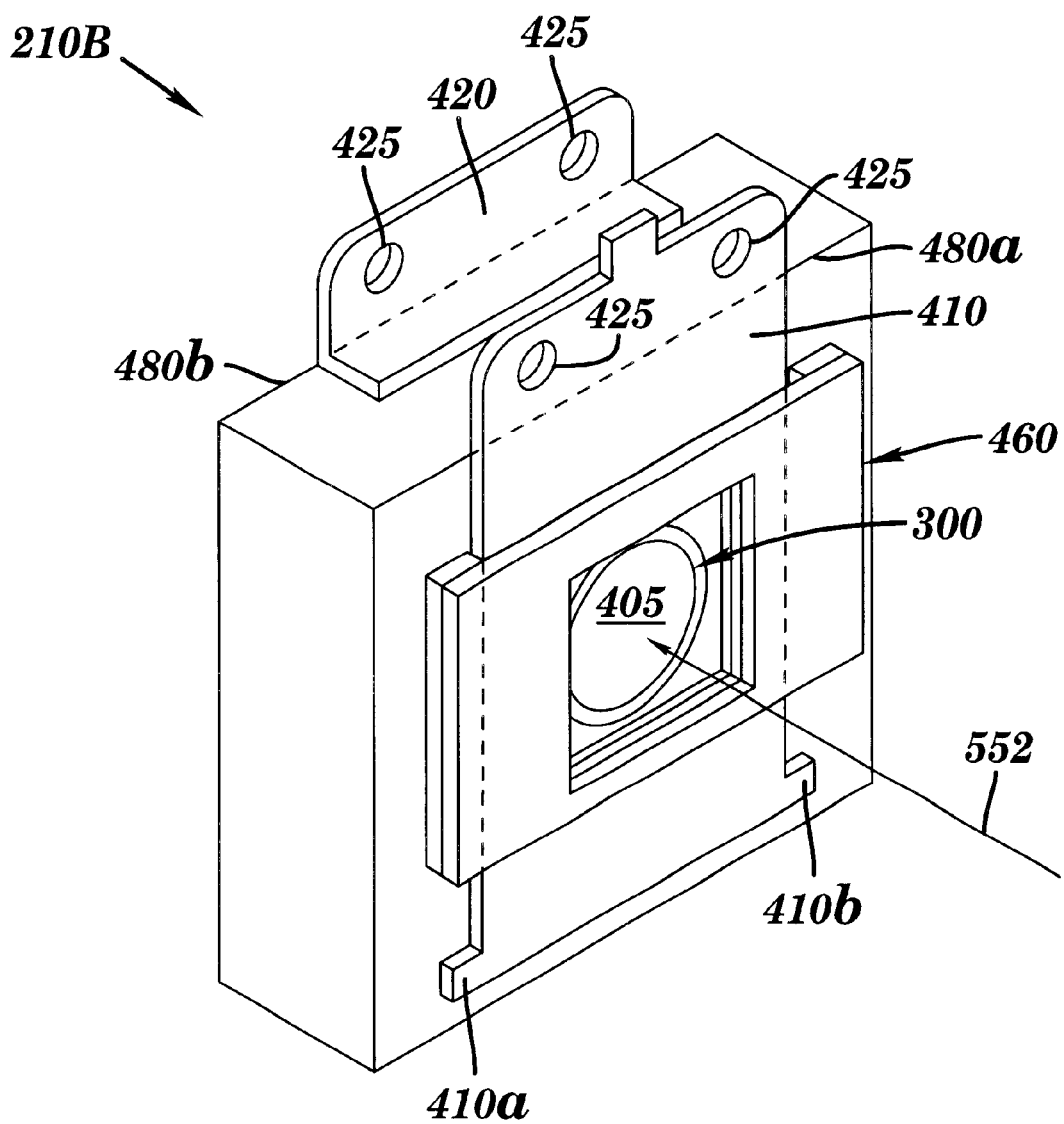
FIG. 4A shows an isometric view of a second embodiment of the coarse filter cassette in accordance with the present invention.
Figure 4B:
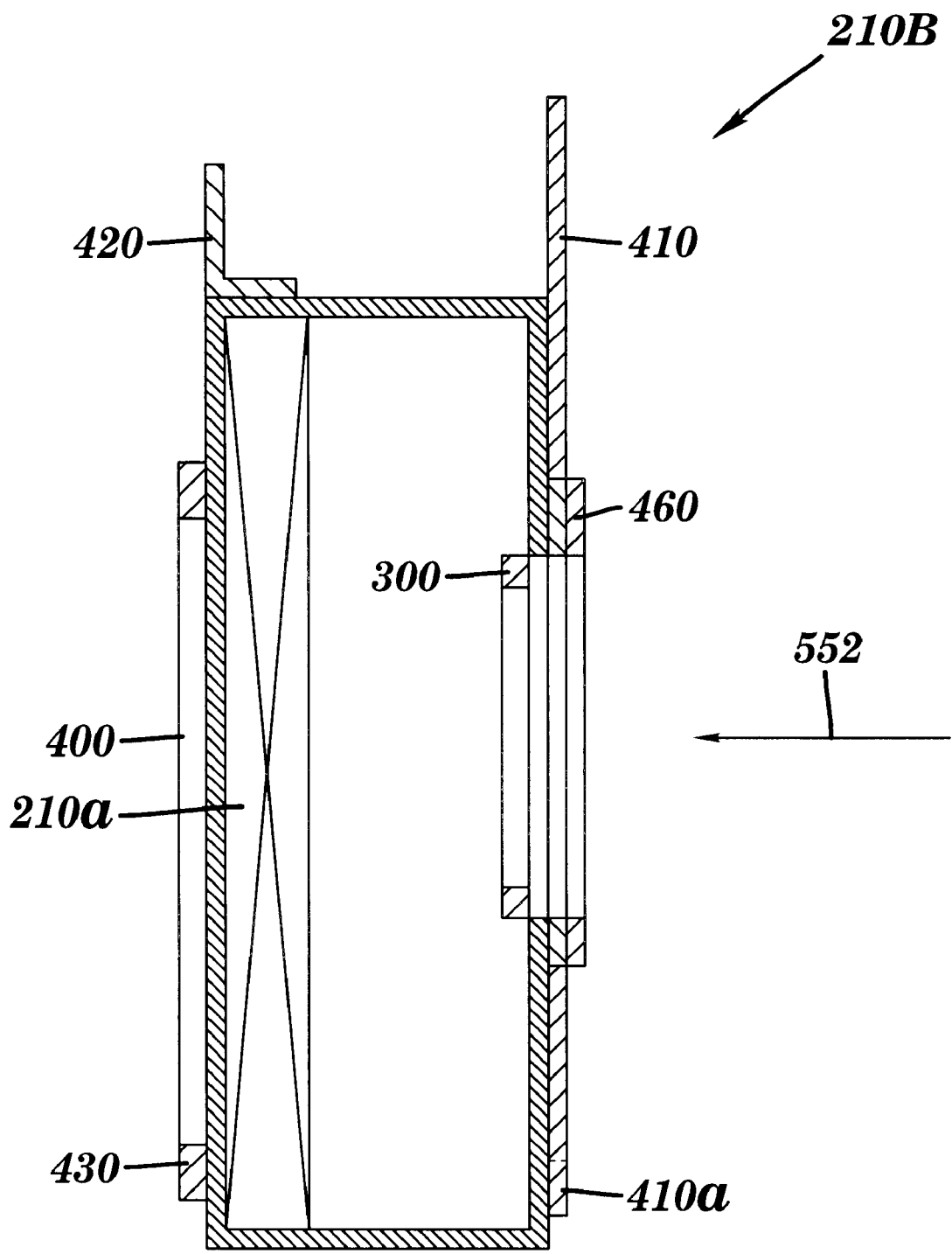
FIG. 4B shows a side view of the second embodiment of the coarse filter cassette shown in FIG. 4A.

FIGS. 4A and 4B detail a second embodiment of the coarse filter cassette 210. As shown, the coarse filter cassette 210B includes a foam or preferably rubber seal 300, identical to that described above with reference to FIGS. 3A and 3B, for sealing the cassette to the transport tube 205 which receives the stream of air and ablative particles from the imager 110 and is inserted in inlet opening 405. Tab retainer 460 supports a sliding tab 410, shown in FIGS. 4A and 4B to be positioned such that the flow passageway 405 to the coarse filter element 210a is open. It will be recognized by those skilled in the art that by pulling up on tab 410, the tab will slide upward guided by tab retainer 460 until nubs 410a and 410b make contact with the retainer 460. It will also be understood that with the tab nubs 410a and 410b contacting the retainer 460, the inlet opening 405 to the coarse filter element 210a will be covered by the tab 410 thereby sealing off the opening 405. A fixed tab 420 is also permanently mounted to the cassette 210B. Both tab 410 and tab 420 are provided with finger holes 425 in which an operator can insert his/her fingers to grip the tabs prior to pulling up on the tabs. When the coarse filter cassette 210B is installed in the flow passage 260, the top portion of tab 410 is preferably bent along cassette edge 480a and folded over onto the top of the cassette 210B. Similarly, the top portion of tab 420 is preferably bent along cassette edge 480b and also folded over onto the top of the cassette 210B.

Removal is achieved by unfolding the tabs to the positions shown in FIGS. 4A and 4B, and pulling either on tab 410 or preferably on both of tabs 410 and 420, to remove the cassette 210B through the access opening provided by door 240. When the cassette 210B is removed after usage by pulling up on tab 410, the inlet opening 405 is automatically sealed. Because the inlet opening 405 is sealed before the contaminated filter cassette 210B is removed from the flow passage 260, the unintentional scattering of collected ablative particles from the cassette during its removal from the flow passage 260 is reduced and the operator and the surrounding environment are protected.

As shown in FIG. 4B, a rubber or preferably foam insulating seal 430, identical to seal 430 of FIG. 3B, is attached, preferably by a permanent adhesive, to the downstream side of the coarse filter cassette 210B. The seal 430 surrounds to outlet opening 400 and helps to seal the cassette 210B within the flow passage 260.

Figure 5A:
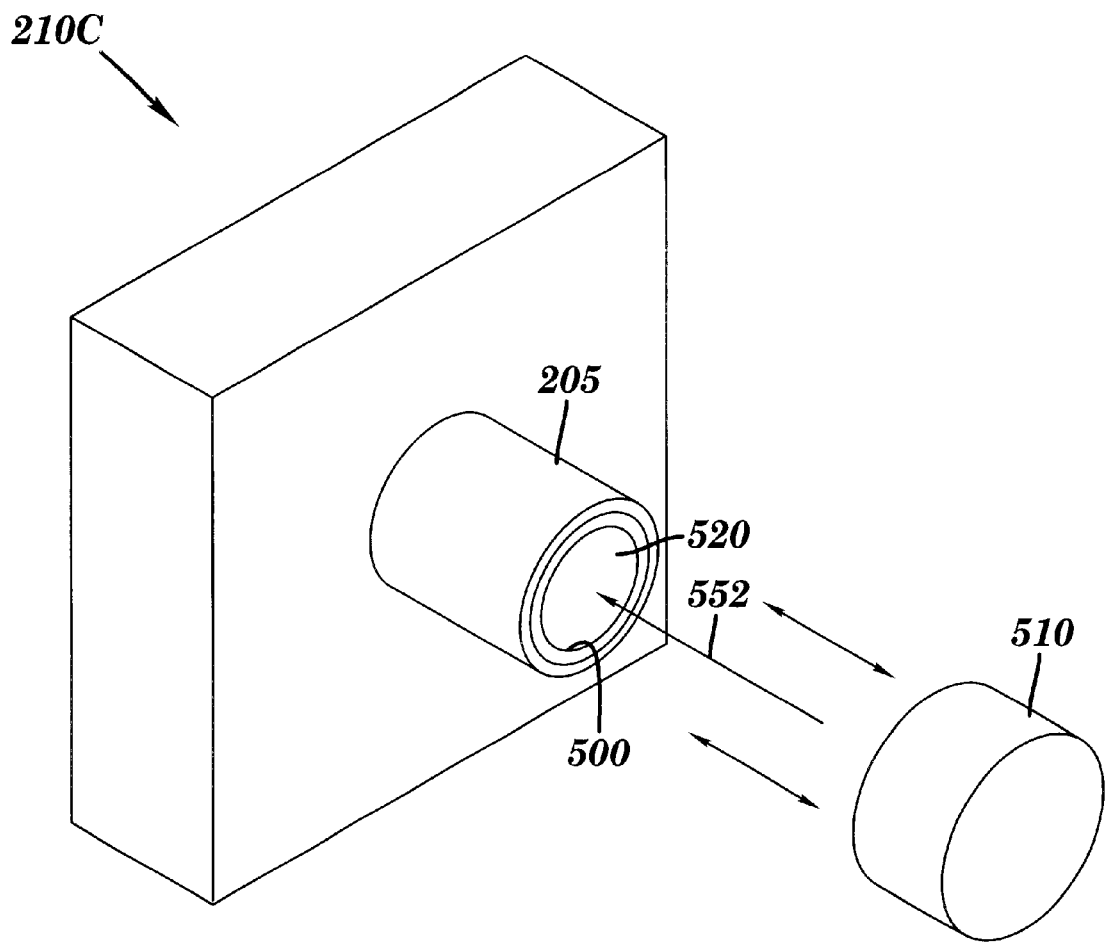
FIG. 5A shows an isometric view of a third embodiment of the coarse filter cassette in accordance with the present invention.
Figure 5B:
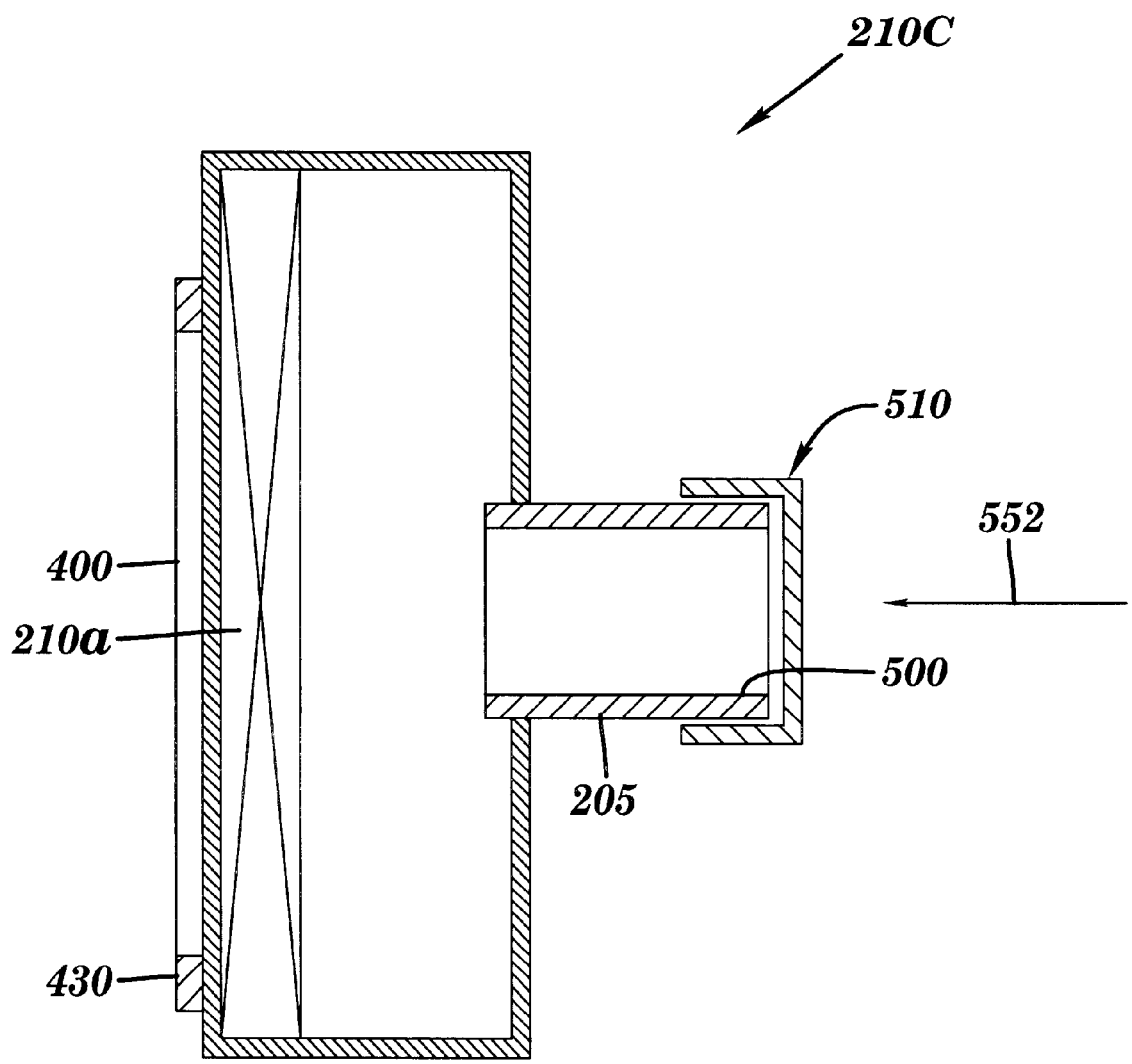
FIG. 5B shows a side view of the third embodiment of the coarse filter cassette shown in FIG. 5A.

FIGS. 5A and 5B detail a third embodiment of the coarse filter cassette 210 particularly suitable for use with the filtration unit 120 configured with the access door 290 arrangement shown in FIG. 2B. As shown, the coarse filter cassette 210C incorporates the transport tube 205. A foam or preferably rubber seal 500, similar to previously described seal 300, is affixed to the transport tube 205 in order to seal the connection between the outlet of the flexible duct 117 in the imager and the filtration unit 120 with the coarse filter cassette 210C installed within the filtration unit. Accordingly, the transport tube 205 of the cassette 210C itself receives the stream of air 552 and ablative particles 150 from the imager 110. Alternatively, the transport tube 205 could be inserted into a somewhat larger tube (not shown) attached to the flexible duct 117 in the imager. In such case, the seal 500 is not required. Instead, the larger tube (not shown) will incorporate a seal to seal around the transport tube 205 when inserted in the larger tube.

A tubular cap 510 is provided with the coarse filter cassette 210C. The cap 510 fits snugly over the inlet end of the transport tube 205 during installation and removal of the coarse filter cassette 210C into and from the filtration unit 120. As can perhaps best be seen in Figure SA, with cap 510 removed from the transport tube 205, the transport tube 205 provides an open flow passageway 520 to the coarse filter element 210a. With the cap 510 mounted onto transport tube 205, the flow passageway 520 to the coarse filter element 210a will be covered by the cap 510 thereby sealing off the opening 520, as can perhaps best be seen in FIG. 5B. The installed tubular cap 510 also aids in removal of the coarse filter cassette 210C.

Should the operator inadvertently attempt to operate the filtration unit with the cap 510 installed on the transport tube 205, the sensor 268 will detect a pressure change similar to that detected when the coarse filter cassette 210 is saturated. In such a case, sensor 268 will generate a signal which is transmitted via the sensor interface 268a and processor interface 134 to the processor 130. The processor 130 will process the received signal and will respond in the same manner as discussed above with reference to detection of a saturated coarse filter cassette.

Removal of the coarse filter cassette is achieved by pulling on the transport tube 205 and removing the cassette 210C through the access opening provided by door 290, only after cap 510 is installed. When the cassette 210C is removed after mounting cap 510, the passageway 520 is automatically sealed. Because the passageway 520 is sealed before the contaminated filter cassette 210C is removed from the flow passage 260, the unintentional scattering of collected ablative particles from the cassette during its removal from the flow passage 260 is minimized and the operator and the surrounding environment are protected.

As shown in FIG. 5B, a rubber or preferably foam insulating seal 430, identical to the seals previously identified with the same reference numerals, is attached, preferably with permanent adhesive, to the downstream side of the coarse filter cassette 210C surrounding outlet opening 400. The seal 430 helps to seal the cassette 210C within the flow passage 260.

Figure 6:
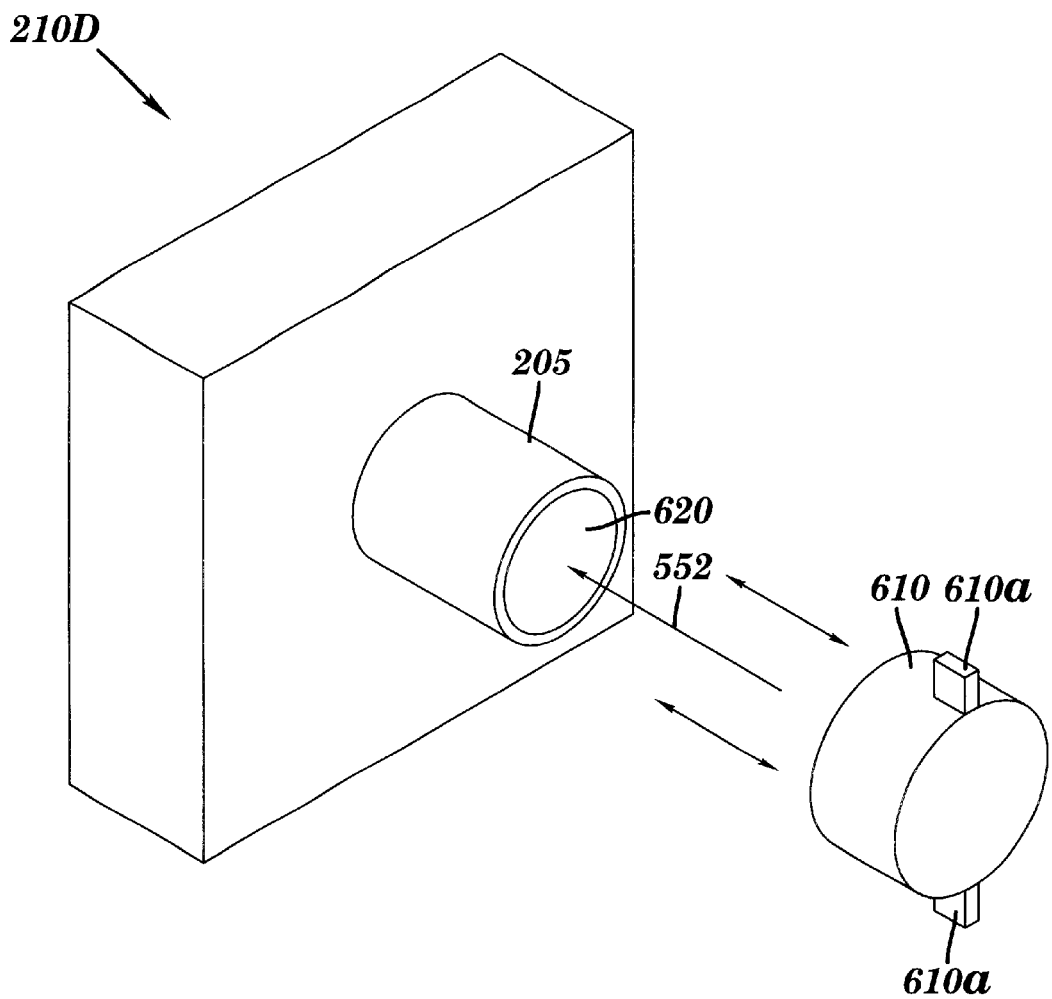
FIG. 6 shows an isometric view of a fourth embodiment of the coarse filter cassette in accordance with the present invention.

FIG. 6 depicts a fourth embodiment of the coarse filter cassette 210, which is particularly suitable for use with the filtration unit 120 configured with the access door 290 arrangement shown in FIG. 2B and for use with an imager which incorporates an outlet tube (not shown) in which the transport tube 205 can be inserted. As shown, the transport tube 205 includes an opening 620 which does not have an attached seal similar to seal 500 of FIG. 5A. Rather, the seal is incorporated within the imager outlet tube (not shown) to contact the outer surface of the transport tube 205 when inserted into the imager outlet tube to prevent the escape of ablative particles from the imager 110 into the surrounding environment.

A tubular cap 610 is provided with the coarse filter cassette 210D. The cap 610 fits snugly over the inlet end of the transport tube 205 during installation and removal of the coarse filter cassette 210D into and from the filtration unit 120. With cap 610 removed from the transport tube 205, the transport tube 205 provides an open flow passageway 620 to the coarse filter element 210a. With the cap 610 mounted onto transport tube 205 of the flow passageway 620 to the coarse filter element 210a will be covered by the cap 610 thereby sealing off the opening 520. The installed tubular cap 610 also aids in the removal of the coarse filter cassette 210D.

In order to prevent the transport tube 205 being inserted into the outlet tube (not shown) of the imager 110 with the cap 610 installed, stop members 610a form protrusions in the cap 610. The stop members 610a are sufficient in size to prevent the cap from being inserted into the imager outlet tube (not shown) accordingly, an operator is prevented from moving the filtration unit 120 to an operational position with respect to the imager 110 if the cap 610 remains installed on the transport tube 205, thereby ensuring that no attempt is made to initiate imaging without the flow passageway 620 being open to accept the flow of air and ablative particles from the imager 110.

Figure 7A:
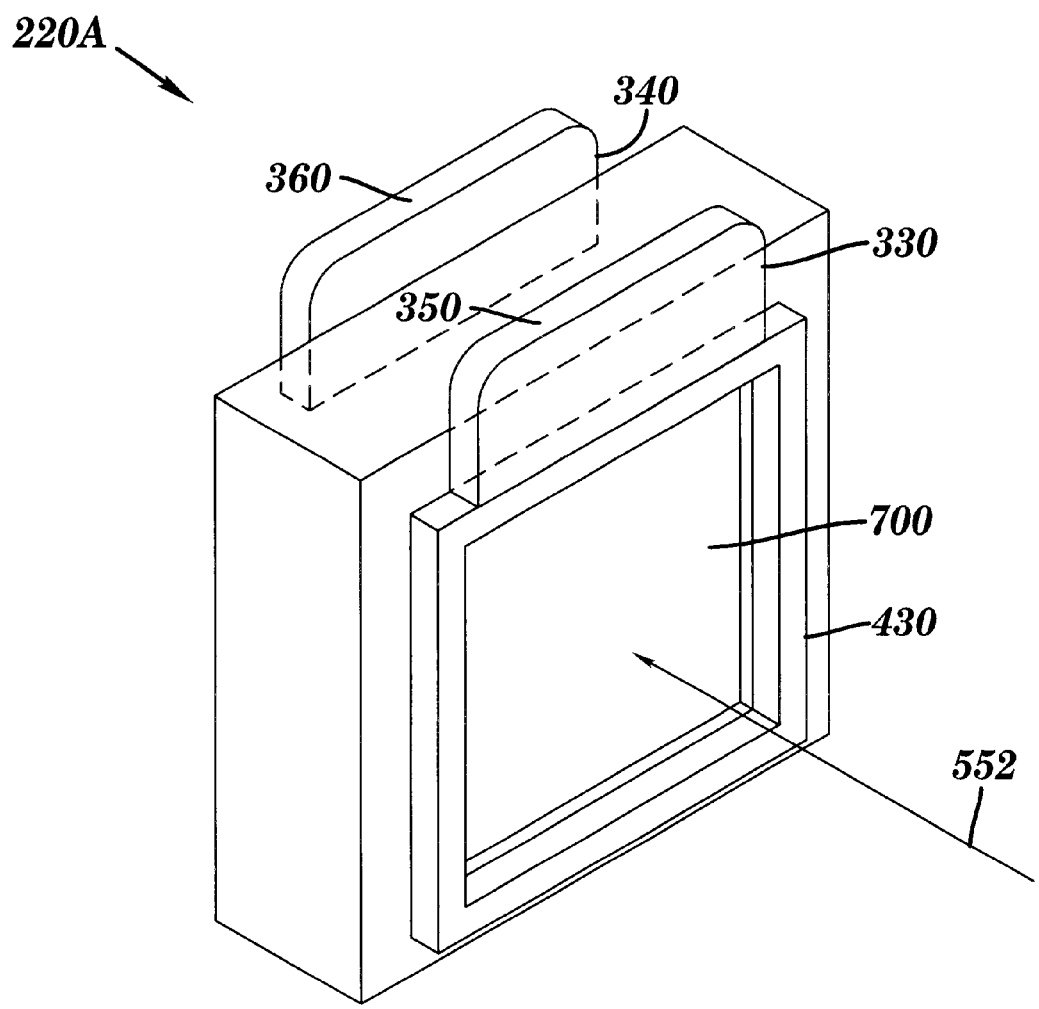
FIG. 7A shows an isometric view of a first embodiment of a fine filter cassette in accordance with the present invention.
Figure 7B:
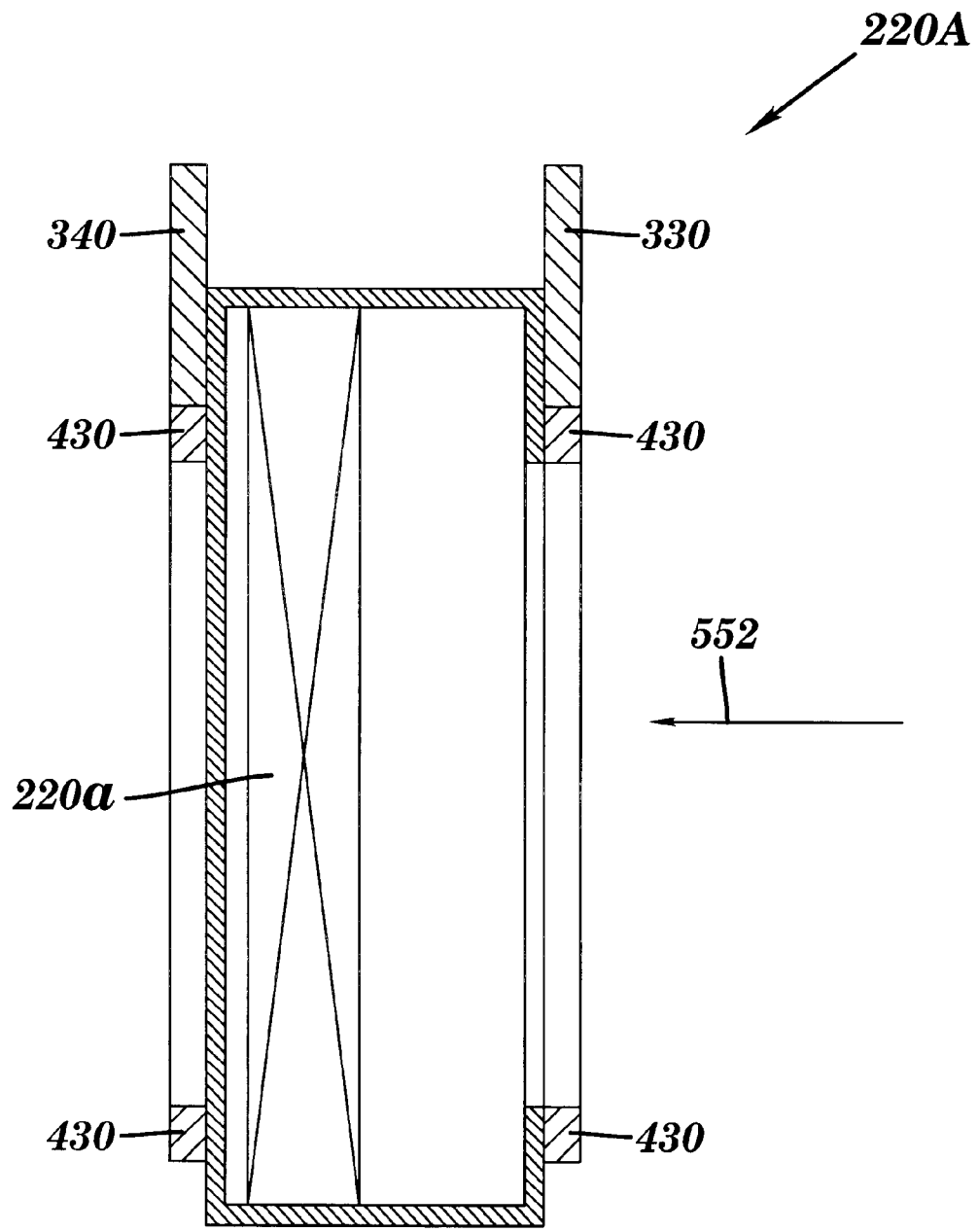
FIG. 7B shows a side view of the first embodiment of the fine filter cassette shown in FIG. 2A.

FIGS. 7A and 7B depict a first embodiment of the fine filter cassette 220. As shown, the fine filter cassette 220A includes fine filter element 220a as has been previously described. As shown in the Figures, rubber or preferably foam insulating seals 430, each of which is identical to the seals 430 described above, are attached, preferably by a permanent adhesive, to both the upstream and downstream sides of the fine filter cassette 220A so as to surround inlet/outlet openings 700. As discussed above, the seals 430 help to seal the cassette 220 within the flow passage 260.

To install and remove the cassette 220A through the access area in the flow passage 260 created by opening the door 250, tack plates 330 and 340, which are identical to those previously described, are adhered to the cassette 220A. With the tack plates attached to the surface of the fine filter cassette 220A as shown in FIGS. 7A and 7B, handles 350 and 360 are used to move the cassette 220A to or from it's proper installation position in the flow passage 260.

As described above, the adhesive surfaces can be protected with protective strips when the tack plates 330 and 340 are not being used to install or remove the cassette from the flow passage 260. During installation or removal of the cassette, the protective strips are removed to reveal the adhesive surfaces which are then adhered to the surface of the fine filter cassette 220A as shown in FIGS. 7A and 7B. Alternatively, when the tack plates 330 and 340 are not being used to install or remove the cassette from the flow passage 260 the adhesive surfaces can, if desired, be adhered to the top surface of the fine filter cassette 220, thereby protecting adhesive surfaces on the tack plates from contamination and facilitating convenient storage for the tack plates 330 and 340. After removal, the cassette 220A is preferably wrapped and sealed in a plastic disposal bag as previously described. A plastic bag may be similarly used of wrapping of other cassettes described herein.

Figure 8A:
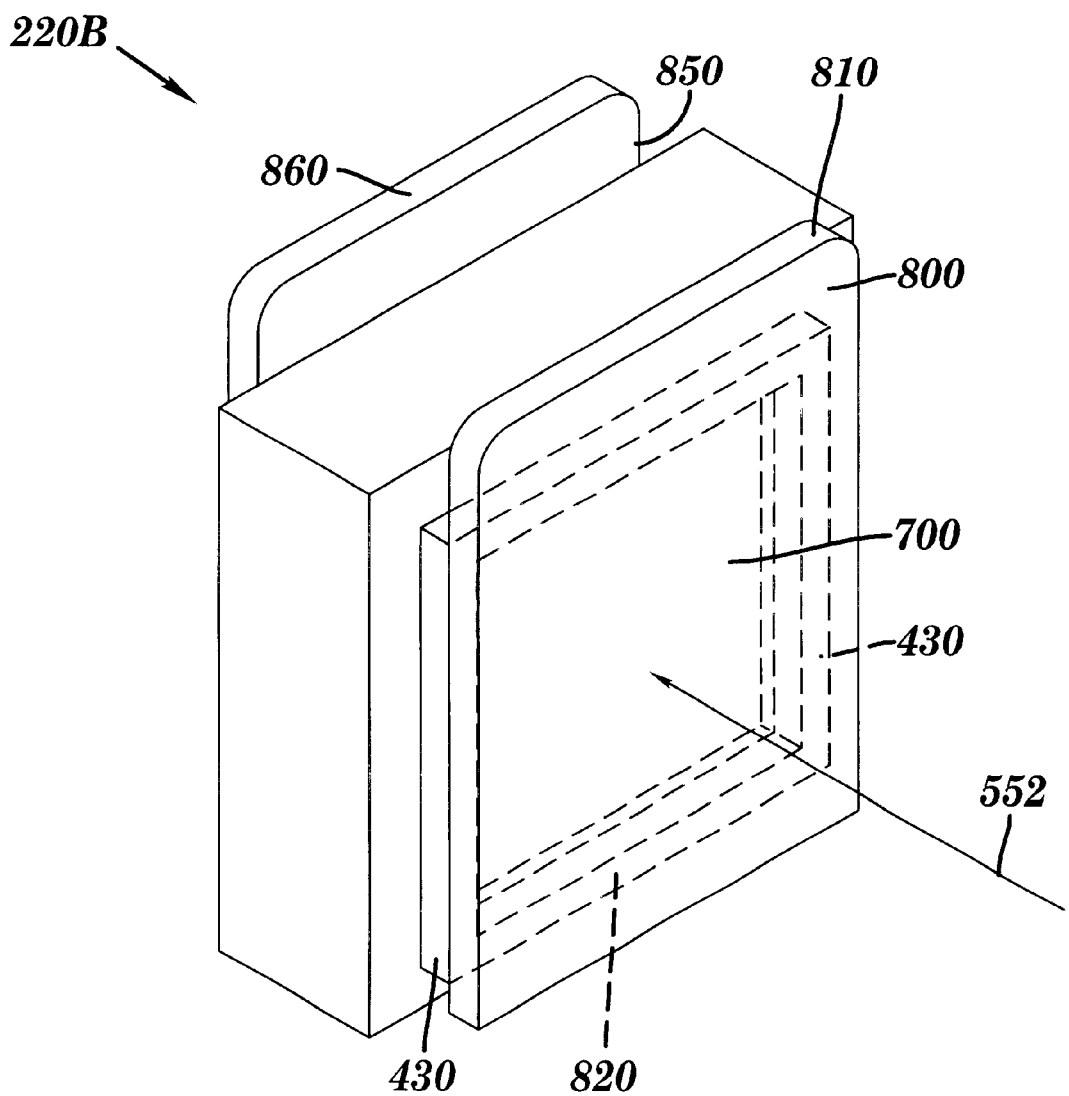
FIG. 8A shows an isometric view of a second embodiment of the coarse filter cassette in accordance with the present invention.
Figure 8B:
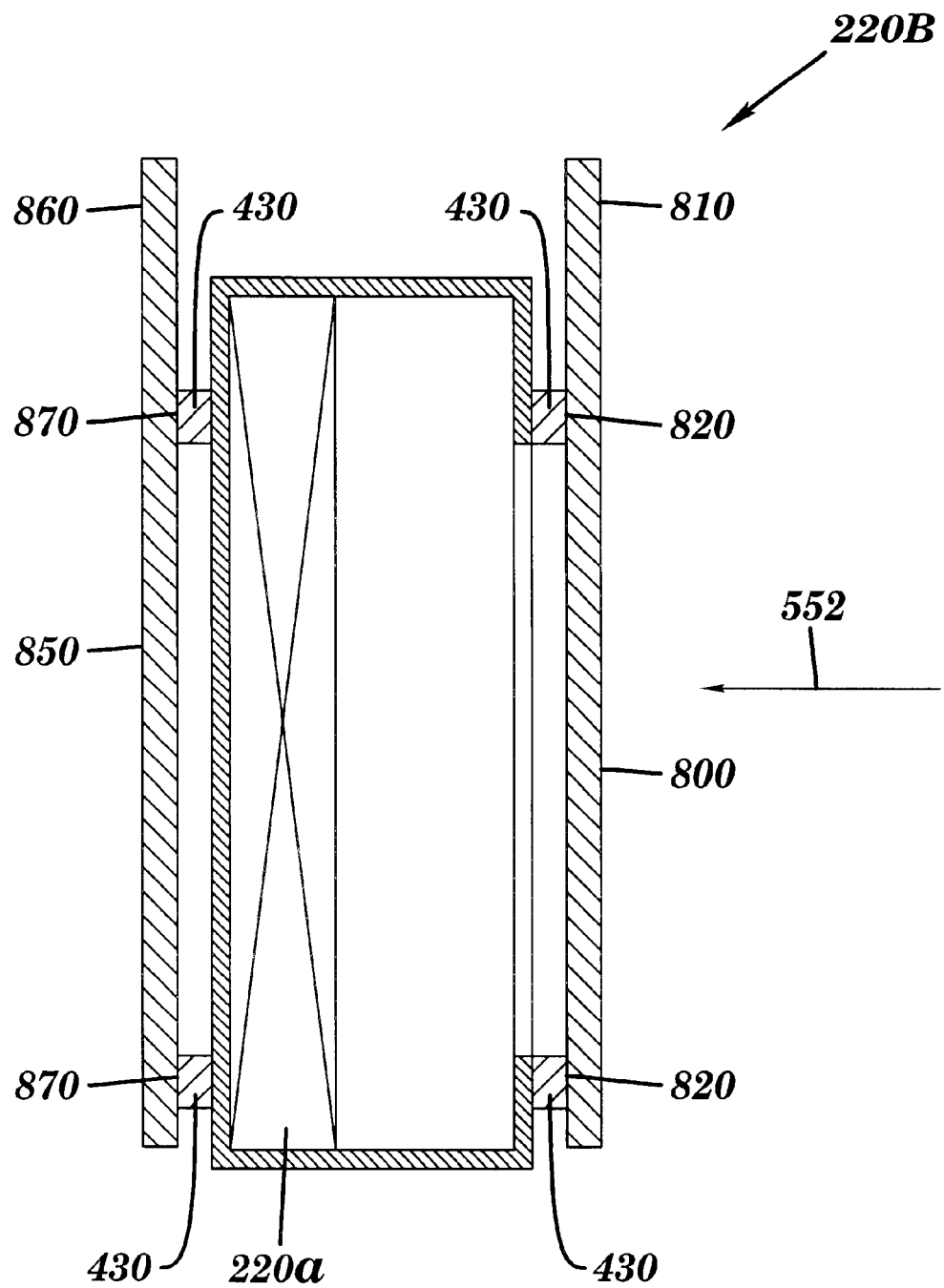
FIG. 8B shows a side view of a second embodiment of the coarse filter cassette in accordance with the present invention.

FIGS. 8A and 8B depict a second embodiment of the fine filter cassette 220. As shown, the fine filter cassette 220B includes fine filter element 220a as has been previously described. As shown in the Figures, rubber or preferably foam insulating seals 430, each of which is identical to the seals 430 described above, are attached, preferably by a permanent adhesive, to both the upstream and downstream sides of the fine filter cassette 220B so as to surround inlet/outlet openings 700. As described above, the seals 430 help to seal the cassette 220B when installed in the flow passage 260.

To install and remove the cassette 220B through the access area in the flow passage 260 created by the removal of the door 250, tack plates or handles 800 and 850 are adhered to the cassette 220B. The tack plates 800 and 850 have adhesive surfaces 820 and 870, which can be adhered to the seals 430 attached to the inlet and outlet sides of the cassette 220B. Preferably the adhesive surfaces 820 and 870 are configured to match the configuration of the applicable seal 430 to which it will be adhered. The adhesive surfaces 820 and 870 are protected by protective strips (not shown) when the tack plates 800 and 850 are not being used to install or remove the cassette 220B from the flow passage 260. During installation or removal of the cassette 220B, the adhesive surfaces 820 and 870 are revealed by removing the protective strips (not shown) and adhered to the applicable cassette seal 430 as shown in FIGS. 8A and 8B. With the tack plates 800 and 850 attached to the seals 430 of fine filter cassette 220B, handle grip members 810 and 860 are used to move the cassette 220B to or from its proper installation position in the flow passage 260. With the tack plates 800 and 850 attached during removal of a contaminated fine filter cassette 220B, the filtered ablative particles are sealed within the cassette 220B thereby ensuring that such particles do not escape into the surrounding environment during replacement and disposal of the fine filter cassette 220B.

FIGS. 9A–9D depict exemplary filter clamp mechanisms 900 and 920 which can optionally be used to apply pressure to the coarse filter cassette 210 and fine filter cassette 220 when positioned within the flow passage 260, in order to compress the seal(s) 430. The use of the clamp mechanisms 900 and 920 will secure the cassettes in their proper installed position.

The applied pressure compresses, to a desired extent, the cassette seals 430. The clamps can also be used to apply pressure to the tack plates to ensure proper adhesion to the upstream and downstream sides of the applicable cassette before using the tabs or handles to remove the cassette from the flow passageway.

Figure 9A:
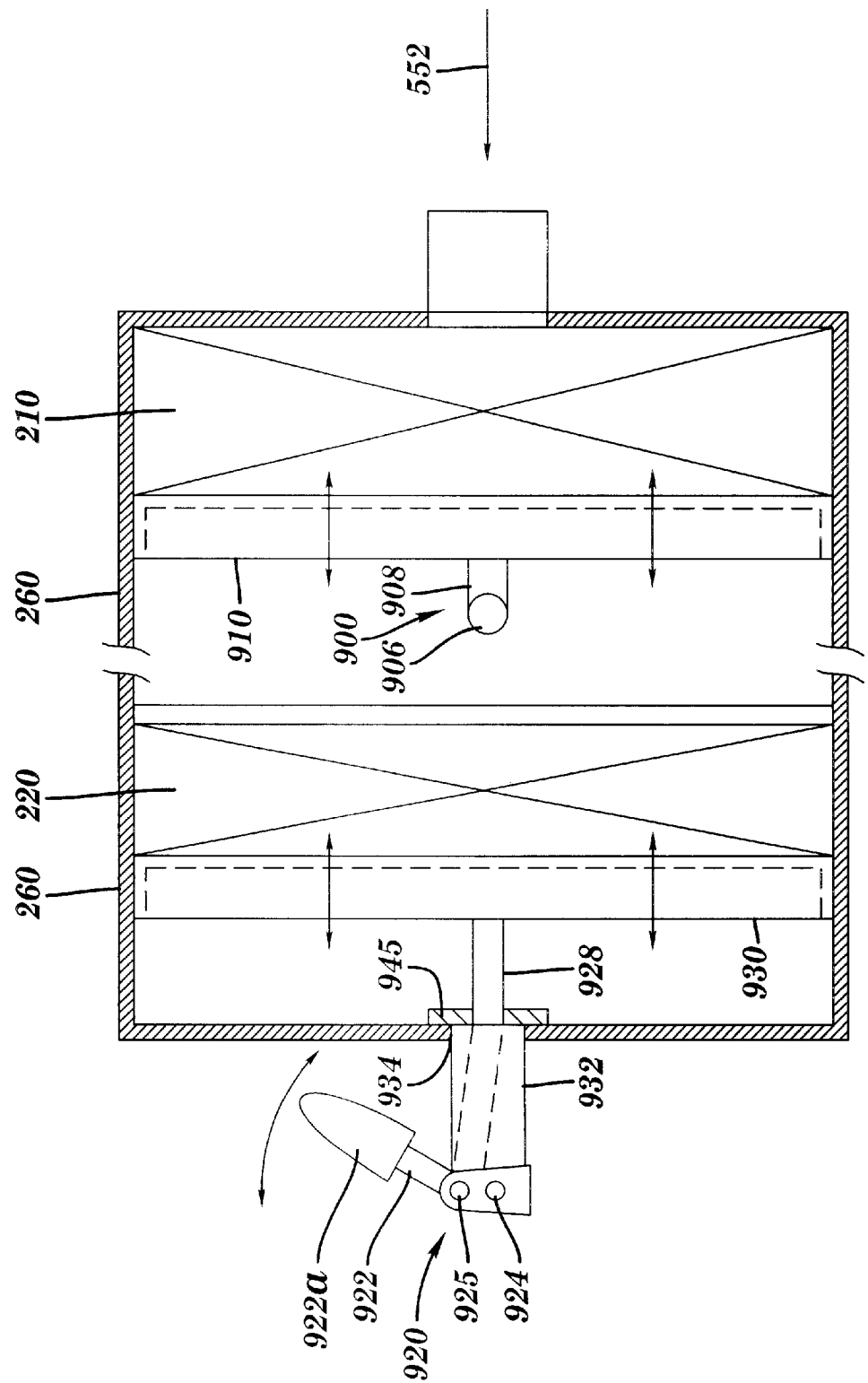
FIG. 9A shows a top view of the filtration unit of FIGS. 2A and 2B, including filter clamps for securing the coarse and five filter cassettes.
Figure 9B:
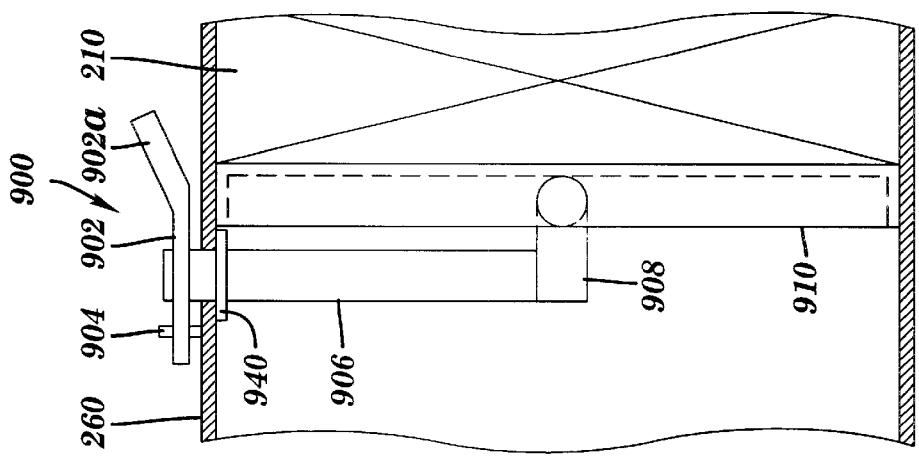
FIG. 9B shows a side view of one of the filter clamps shown in FIG. 9A.
Figure 9C:
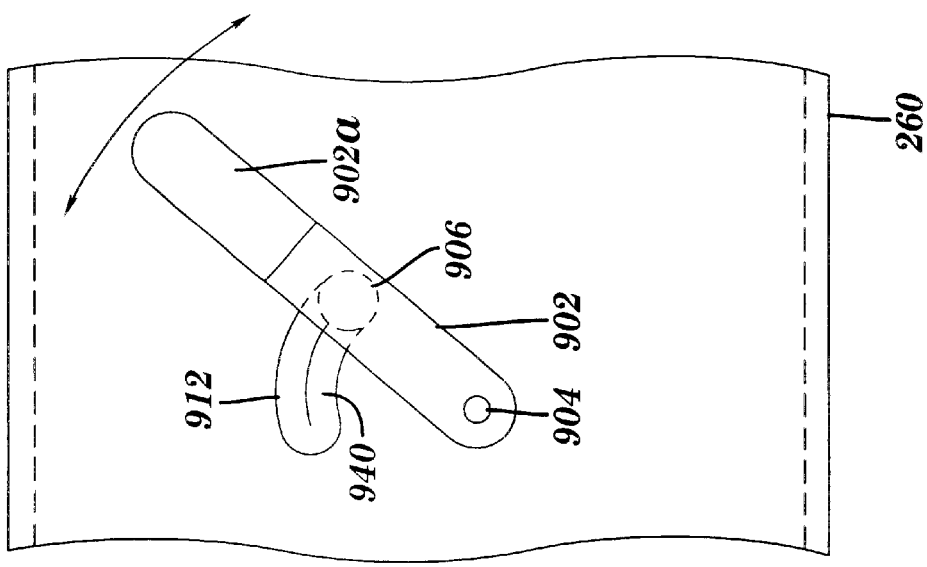
FIG. 9C shows a top view of the filter clamp shown in FIG. 9B.

As shown in FIGS. 9A–9C, the filter clamp 900 for securing the coarse filter cassette 210 includes a lever 902, having a handle portion 902a. The lever 902 is movable about a pivot pin 904 by applying a force to the handle portion 902a of the lever 902. Connected to the lever 902 is a first tubular transfer member 906 which passes through a slot 912 in the flow passage 260 and connects to a second tubular transfer member 908. Transfer member 908 in turn connects to pressure frame 910, which will be described in more detail with reference to FIG. 9D. A flexible rubber or foam seal 940 is attached to the flow passage 260 to seal the slot 912 around the transfer member 906. The seal 940 preferably automatically self seals the opening surrounding the member 906 as it moves in the slot 912.

The operator secures the coarse filter cassette by applying a force to the handle 902a to thereby rotate the lever 902 clockwise about the pivot pin 904. As the lever 902 rotates, the first transfer member 906 moves within the slot 912. The movement of the transfer member 906 causes a compression force on the second transfer member 908 which causes the frame 910 to move towards the coarse filter cassette 210. Once the frame 910 makes contact with the cassette 210, continued movement of the lever 902 will result in a pressure being applied by the frame 910 to the cassette 210 thereby compressing the seal 430. Similarly, if the tack plates have been adhered to the upstream and/or downstream surfaces of the cassette 210, the continued movement of the lever 902 will result in a pressure being applied to the tack plates thereby ensuring proper contact of each tack plate's adhesive surface with the cassette surface. The lever 902 can be locked in place by any conventional means to maintain the first transfer member 906 in contact with the end of the slot 912 as shown in FIG. 9C.

Rotating the filter clamp 902 in the counterclockwise direction releases the pressure on the coarse filter cassette. This in turn allows the cassette to be moved so that seal 300 or 500 is drawn off transport tube 205 or expandable duct 117, as applicable. The applicable tabs or cap can then be used to remove the cassette 210 from the flow passage 260.

As shown in FIG. 9A, the filter clamp 920 for securing the fine filter cassette 220 includes a lever 922, having a handle portion 922a. The lever 922 is movable about a pivot pin 924 by applying a force to the handle portion 922a of the lever 922. Connected to the lever 922 by pin 925 is a first tubular transfer member 928 which passes through a shroud 932 and a somewhat oversized opening 934 in the flow passage 260. The tubular transfer member 928 connects to pressure frame 930, which will be described in more detail with reference to FIG. 9D. A flexible rubber or foam seal 945 is optionally attached to the flow passage 260 to cover the opening 934 around the transfer member 926. The seal 945 preferably automatically self covers the opening 934 surrounding the member 928 as it moves in the opening 934.

The operator secures the fine filter cassette by applying a force to the handle 922a to thereby rotate the lever 922 clockwise about the pivot pin 924. As the lever 922 rotates, the transfer member 928 moves within the opening 934 and slightly rotates about pin 925. The movement of the transfer member 928 causes the frame 930 to move towards the fine filter cassette 220. Once the frame 930 makes contact with the cassette 220, continued movement of the lever 922 will result in a pressure being applied by the frame 930 to the cassette 220 thereby compressing the seals 430. Similarly, if the tack plates 330 and 340, or 800 and 850, have been adhered to the upstream and downstream surfaces of the cassette 220, the continued movement of the lever 922 will result in a pressure being applied to the tack plates thereby ensuring proper contact of each adhesive surface with the cassette surface. The lever 922 can be locked in place by any conventional means to maintain the frame 930 at the desired position.

Rotating the filter clamp lever handle 922a in the counterclockwise direction releases the pressure on the fine filter cassette 220. The applicable tack plates can then be used to remove the cassette 220 from the flow passage 260.

Figure 9D:
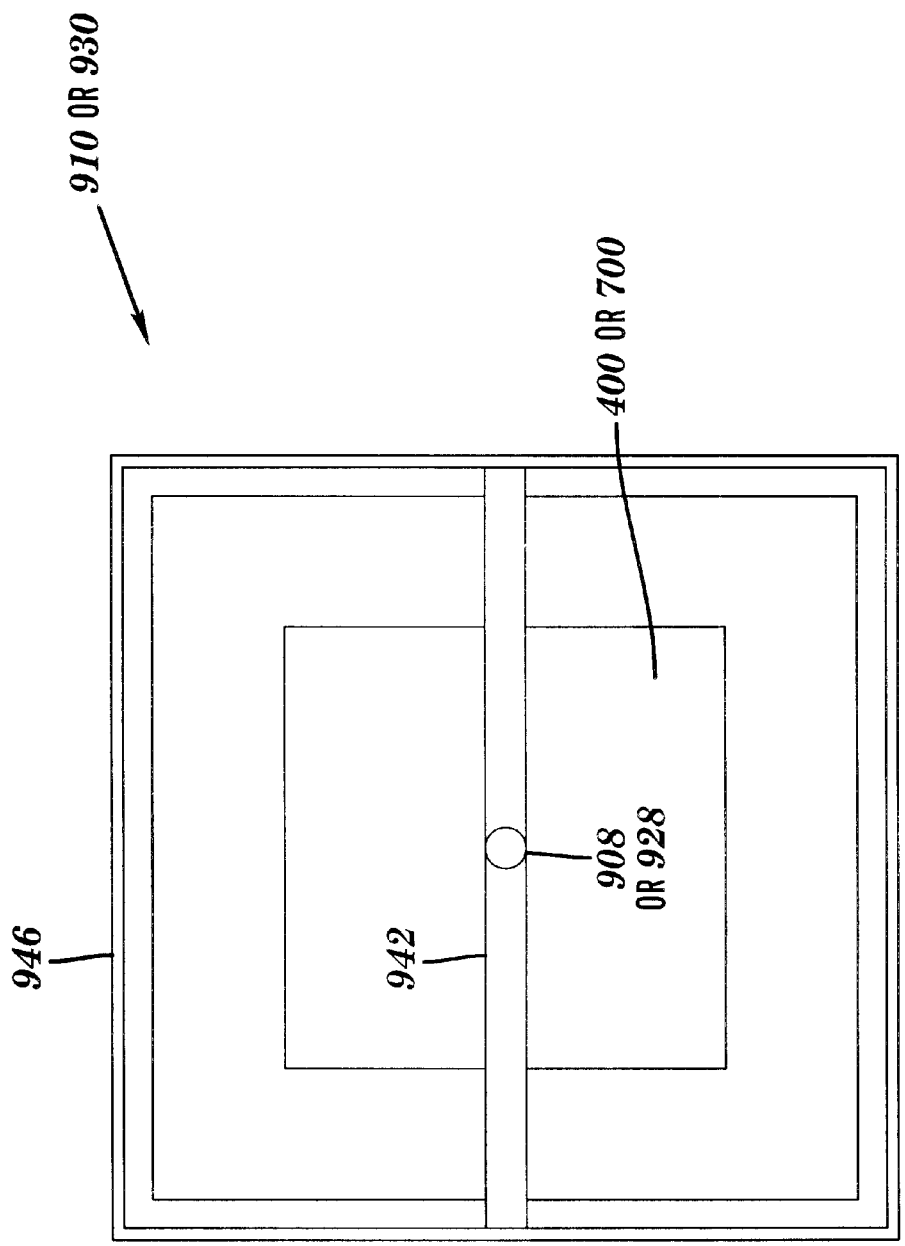
FIG. 9D shows a view of the pressure frames shown in FIG. 9A.

FIG. 9D details an exemplary configuration of frame 910 or 930. As shown, the exemplary frame is formed of an outer rectangular frame 946 having angle shaped members. A cross member 942 connects opposed sides of the outer frame 946. The cross member 942, although depicted as a tubular shaped member, might preferably be an angle shaped member. However, it will be recognized that the selection of a desired type cross member or frame member is a routine design choice well understood by those skilled in the art. The transfer member 908 or 928, as applicable, connects to the cross member 942.

It should be noted that with coarse filter cassette access opening and door arrangement shown in FIG. 2B, it will typically be advantageous to eliminate filter clamp mechanism 900 shown in FIGS. 9A-9D and instead rely on locking mechanisms 292 of FIG. 2B to transfer a force to the door 290 which in turn applies sufficient pressure against an upstream outer surface of the cassette 220 to compress the seal 430 on the downstream outer surface against a fixed frame member (not shown) installed within the flow passage 260.

Figure 9E:
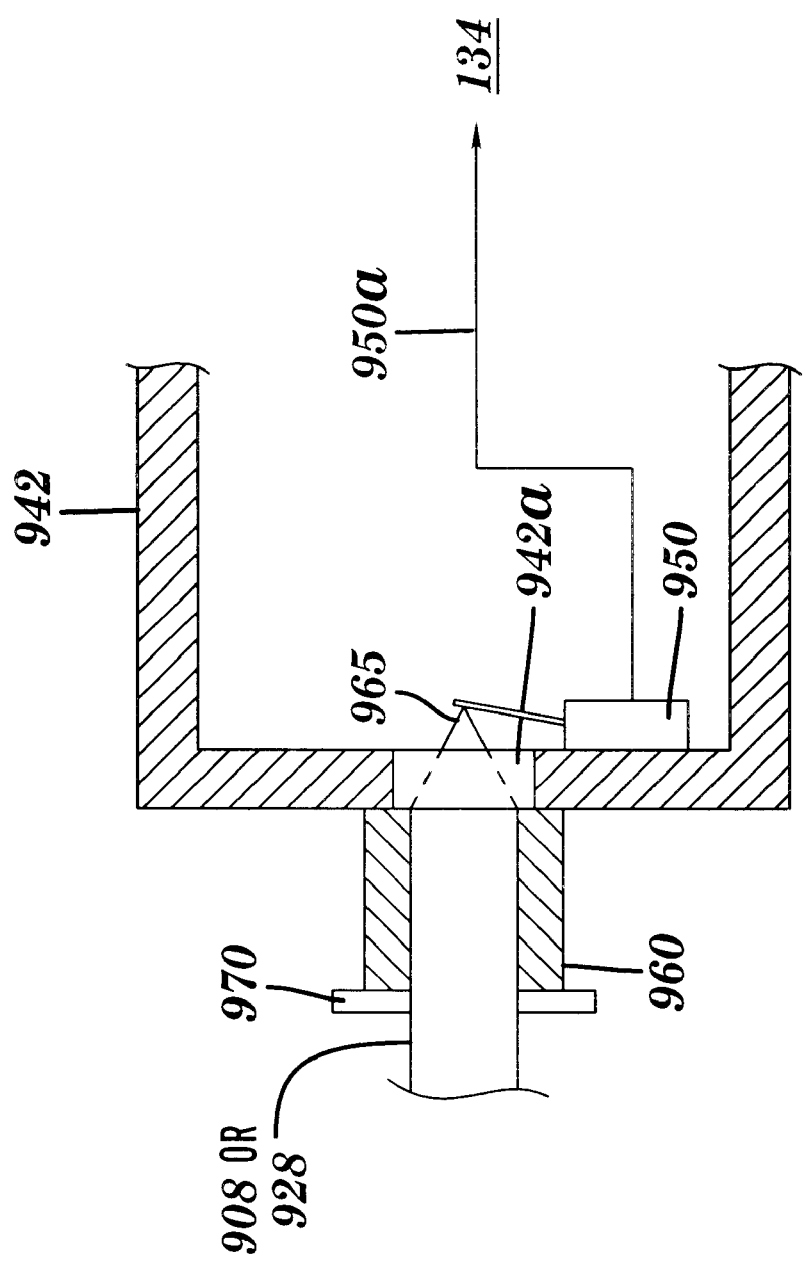
FIG. 9E shows a cross-section of the pressure frame of FIG. 9D.

FIG. 9E is an exemplary depiction of a cross section of the cross member 942 in the area where the transfer member 908 or 928 connects to the cross member 942. As shown, the transfer member 908 or 928 is connected to the cross member 942 with a spring 960. Preferably, the spring connects to a flange portion 970 of the applicable transfer member. Transfer member 908 or 928 includes an insert portion 965 which has a range of movement in and out of aperture 942a in the cross member 942. If a tension force is applied to the transfer member 908 or 928 the spring 960 will stretch in the release direction and the insert portion 965 of the transfer member 908 or 928 will move in the release direction away from the aperture 940a. When compression is applied to the transfer member 908 or 928, the spring 960 will be compressed in the locked direction and the insert portion 965 will be inserted through the aperture 942a in the cross member 942.

Preferably a sensor 950 is provided to detect, via the lead surface on the insertion portion, when the clamp mechanism is in a proper position for operation, e.g. when the applicable clamping mechanism is in a locked position. As shown, the sensor 950 is a simple electromechanical sensor which has a spring loaded toggle for closing a circuit when the insertion portion 965 of the applicable transfer member 908 or 928 is in a proper operational position. Upon detecting the proper positioning of the insertion portion 965, a signal is generated by the sensor 950 and transmitted via the sensor interface 950*a* and processor interface 134 to the processor 130. The processor 130 monitors the signals to determine if the insertion portion 965 is not properly positioned for operations, and hence that the applicable clamping mechanism has not been properly locked. Upon determination that the clamping mechanism is not properly locked, the processor may generate a control signal which can be transmitted over interface 132 to the imager to prevent initiation of imaging or continuation of imaging, and/or can generate a display signal for presenting a warning and, if desired, instructions for locking the applicable clamping mechanism to the operator. As one can see without fine filter in place frame 946 continues to translate without offering resistance, thus not allowing the flange 950 to compress spring 960 and cause portion 965 to actuate switch 950. Additionally if lever 922 is not fully clamped, spring 960 will offer an opposing force, toward the release direction, and not allow portion 965 to activate switch 950 with the filter in place. This arrangement of signifying that the filter is in place can be used in place of switch 262 described above.

It is to be understood that the above-described embodiments are merely illustrative of the present invention and represent a limited number of specific embodiments that can provide applications of the principles of the invention. Numerous and varied other arrangements may be readily devised in accordance with the principles of the invention as understood by those having ordinary skill in the art.

We claim:

1. A filtration process, comprising the steps of:
   operating a filtration system to filter ablative particles generated by thermal imaging of media;
   transmitting a signal representing a current state of the operation of the filtration system; and
   generating, responsive to the transmitted signal, at least one of (i) operator information associated with the current state operation and (ii) an instruction to prevent the imaging of the media.

2. The filtration process of claim 1, further comprising:
   sensing one of a pressure related parameter and a power related parameter;
   wherein the transmitted signal corresponds to the sensed parameter.

3. The filtration process of claim 2, wherein:
   the pressure related parameter is a change in pressure exceeding a predetermined threshold value; and
   the power related parameter is one of a current and a voltage.

4. The filtration process of claim 1, wherein:
   the represented current state of operation is a current state of a filter.

5. The filtration process of claim 4, wherein the represented current state of the filter is one of fully saturated, improperly installed and not installed.

6. The filtration process of claim 1, wherein:
   the represented current state of operation is a current state of an air-mover.

7. The filtration process of claim 6, wherein the represented current state of the air-mover is one of improperly operating and not operating.

8. The filtration process of claim 1, wherein:
   the represented current state of operation is a current state of a filter access door.

9. The filtration process of claim 8, wherein the represented current state of the filter access door is not properly closed.

10. The filtration process of claim 1, wherein:
    the represented current state of operation is a current state of a physical location of the filtration system.

11. A filtration process, comprising the steps of:
    filtering ablative particles generated by thermal imaging of media using a plurality of filters;
    detecting a parameter representing a current state of said filters using a plurality of first sensors;
    providing a movable access door, said access door operable to provide access to at least one of said plurality of filters;
    providing a second sensor operable to represent a current state of said access door; and
    detecting a parameter representing a current state of said access door using said second sensor.

12. The filtration process of claim 11, further comprising:
    illuminating a light if the parameter detected by a respective one of the plurality of first sensors corresponds to a predefined threshold value.

13. The filtration process of claim 12, wherein the illumination of the light represents one of saturation and non-installation of a respective one of the filters.

14. The filtration process of claim 11, further comprising:
    moving the ablative particles to each of the plurality of filters with an air-mover; and
    wherein the parameter detected by one of the plurality of first sensors represents a current state of the air-mover.

15. The filtration process of claim 11, further comprising:
    moving the ablative particles along a flow path using an air mover; and
    illuminating a respective one of a plurality of indicator lights if the parameter detected by a respective one of the plurality of first sensors corresponds to a predefined threshold value.

16. The filtration process of claim 11, further comprising:
    illuminating each of a plurality of indicator lights if the parameter detected by an associated one of the plurality of first sensors corresponds to a predefined threshold value;
    moving the ablative particles along a flow path using an air-mover;
    wherein the filtering includes coarse ablative particle filtering, fine ablative particle filtering and odor filtering in series along the flow path;
    wherein the parameter representing a current state of the filtering is detected (i) downstream of the coarse ablative particle filtering, (ii) downstream of the fine ablative particle filtering and (iii) downstream of the fine ablative particle filtering and upstream of the air-mover; and
    wherein the odor filtering is performed downstream of the air mover.

17. The filtration process of claim 11, wherein the filtering is performed in a filtration unit, said filtration process further comprising the steps of:
    generating the ablative particles in an imaging unit;
    positioning the filtration unit relative to the imaging unit; and
    wherein the parameter detected by one of the plurality of first sensors represents the relative positioning of the filtration unit to the imaging unit.

18. A filtration system, comprising:
    a filtration unit operable to filter ablative particles generated by thermal imaging of media, and configured to transmit a signal corresponding to a parameter representing a current state of the operation of the filtration unit;

a processor configured to receive the transmitted signals and to generate, responsive to the receipt of the transmitted signal, at least one of a first signal representing operator information associated with the current state operation and a second signal to prevent the imaging of the media.

19. The filtration system of claim 18, wherein the parameter is one of (i) a pressure related parameter and (ii) a power related parameter, and the represented operator information is one of (i) a warning and (ii) a process for correcting a deficiency in the current state of operation.

20. The filtration system of claim 19, wherein the pressure related parameter is a change in pressure exceeding a predetermined threshold value and the power related parameter is an electrical current flow.

21. The filtration system of claim 18, wherein:

the filtration unit includes a filter; and the represented current state of operation is a current state of the filter.

22. The filtration system of claim 21, wherein the represented current state of the filter is one of fully saturated, improperly installed and not installed.

23. The filtration system of claim 18, wherein:

the filtration unit includes an air mover; and the represented current state of operation is a current state of the air-mover.

24. The filtration system of claim 23, wherein the represented current state of the air-mover is one of improperly operating and not operating.

25. The filtration system of claim 18, wherein:

the filtration unit includes a filter access door; and the represented current state of operation is a current state of the filter access door.

26. The filtration system of claim 25, wherein the represented current state of the filter access door is not properly closed.

27. The filtration system of claim 18, wherein the filtration unit includes a sensor for generating the transmitted signal.

28. A filtration unit, comprising:

a housing;

a plurality of filters configured to filter ablative particles generated by thermal imaging of media and positioned within the housing;

a plurality of first sensors positioned within said housing, each one of said plurality of first sensors configured to detect a parameter representing a current state of a respective one of said plurality of filters;

an air-mover configured to move the ablative particles to each of said plurality of filters, said air-mover positioned within said housing; and a second sensor positioned within said housing, said second sensor configured to detect a parameter representing a current state of said air-mover.

29. The filtration unit of claim 28, further comprising:

a plurality of indicator lights, each configured to illuminate if the parameter detected by a respective one of the plurality of first sensors corresponds to a predefined threshold value.

30. The filtration unit of claim 29, wherein the illumination of each of the plurality of indicator lights represents one of saturation and non-installation of a respective one of the filters.

31. The filtration unit of claim 28, further comprising:

a plurality of indicator lights; and wherein each of said plurality of indicator lights is configured to illuminate if the parameter detected by a respective one of said plurality of first sensors or said second sensor corresponds to a predefined threshold value.

32. The filtration unit of claim 28, further comprising:

a filter clamp; and a third sensor positioned within said housing, said third sensor configured to detect a parameter representing a current state of the filter clamp.

33. The filtration unit of claim 28, further comprising:

an access door movable to provide access to one of the plurality of filters; and a third sensor positioned within said housing, said third sensor configured to detect a parameter representing a current state of the access door.

34. The filtration unit of claim 28, further comprising:

a plurality of indicator lights attached to an outer surface of said housing, each of said plurality of indicator lights configured to illuminate if the parameter detected by a respective one of the plurality of first sensors corresponds to a predefined threshold value;

wherein the plurality of filters include a coarse ablative particle filter, a fine ablative particle filter and an adsorbent cell disposed in series along the flow path;

wherein the plurality of first sensors includes a third sensor disposed downstream of the coarse ablative particle filter, a fourth sensor disposed downstream of the fine ablative particle filter; and wherein said second sensor is disposed upstream of the air-mover and downstream of the fine ablative particle filter.

\* \* \* \* \*